United States Patent
Corbalis et al.

(10) Patent No.: US 6,819,815 B1
(45) Date of Patent: Nov. 16, 2004

(54) METHOD AND APPARATUS FOR INDIRECT ADJUSTMENT OF OPTICAL SWITCH REFLECTORS

(75) Inventors: Charles Corbalis, Saratoga, CA (US); John E. Bowers, Santa Barbara, CA (US); Shifu Yuan, Santa Barbara, CA (US); David Welsh, Goleta, CA (US); Roger J. Helkey, Montecito, CA (US)

(73) Assignee: Calient Networks, San Jose, CA (US)

( * ) Notice: Subject to any disclaimer, the term of this patent is extended or adjusted under 35 U.S.C. 154(b) by 214 days.

(21) Appl. No.: 10/015,539

(22) Filed: Dec. 12, 2001

(51) Int. Cl.[7] .............................................. G02B 6/26
(52) U.S. Cl. ........................................ 385/16; 385/17
(58) Field of Search ............................ 385/17, 16, 18, 385/33, 36, 39; 359/640

(56) References Cited

U.S. PATENT DOCUMENTS

| | | | |
|---|---|---|---|
| 5,390,040 A | * 2/1995 | Mayeux | 398/129 |
| 5,461,425 A | 10/1995 | Fowler et al. | |
| 5,793,912 A | * 8/1998 | Boord et al. | 385/37 |
| 5,920,664 A | * 7/1999 | Hirabayashi et al. | 385/16 |
| 6,549,691 B1 | * 4/2003 | Street et al. | 385/18 |
| 6,567,574 B1 | * 5/2003 | Ma et al. | 385/16 |
| 6,580,846 B1 | * 6/2003 | Burroughs et al. | 385/16 |
| 6,600,849 B2 | * 7/2003 | Ducellier et al. | 385/17 |
| 6,625,341 B1 | * 9/2003 | Novotny | 385/18 |
| 6,636,654 B2 | * 10/2003 | McGuire, Jr. | 385/17 |
| 6,643,425 B1 | * 11/2003 | Bowers et al. | 385/18 |

OTHER PUBLICATIONS

U.S. patent application No. 09/548,587 filed Apr. 30, 2000.
Kreyszig, "Advanced Engineering Mathematics", John Wiley & Sons (1993).

* cited by examiner

Primary Examiner—Frank G. Font
Assistant Examiner—K. Cyrus Kianni
(74) Attorney, Agent, or Firm—Beyer Weaver & Thomas LLP

(57) ABSTRACT

An optical switch embodiment includes a switching array of arranged to accomplish switching of input light beams to any of a plurality of output channels and an array of beam monitoring elements for indirectly measuring and providing information used for adjusting output beams. The beam monitoring element further includes means for measuring the angular misalignment and the positional misalignment of a monitor beam and adjusting the reflectors based on monitor beam information such that optical beams are output from the switch having the desired optical characteristics, such as optimized power. Another optical switch embodiment includes an array of rhomboid prism assemblies positioned to receive the output beams from the switching array and such that the beams are split into substantially parallel working and monitor beams. Whereby the working beams pass into the plurality of output channels and the monitor beams pass into the plurality of beam monitoring elements where they are measured to provide information for adjusting the angular misalignment and the positional misalignment of the working beam.

24 Claims, 16 Drawing Sheets

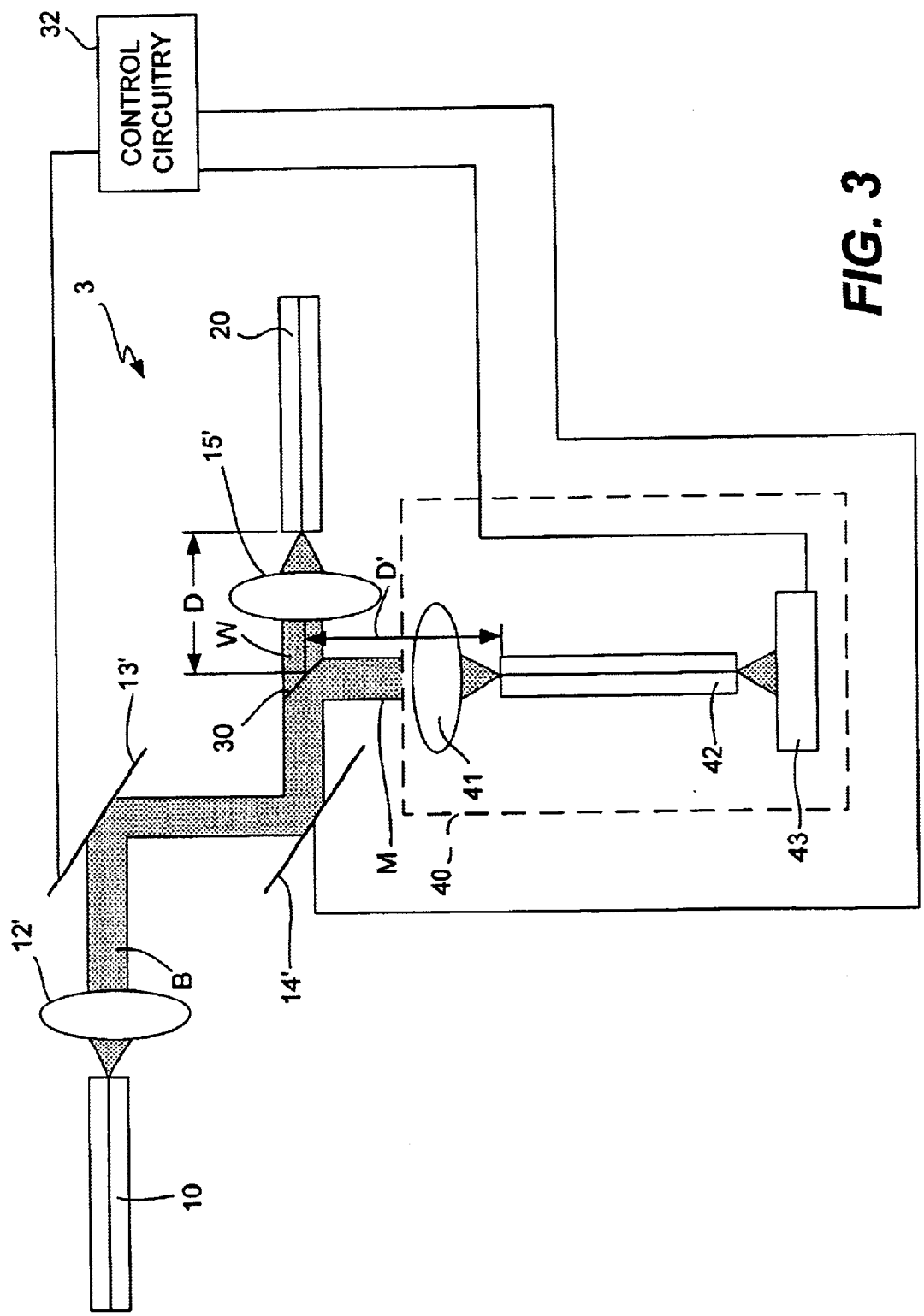

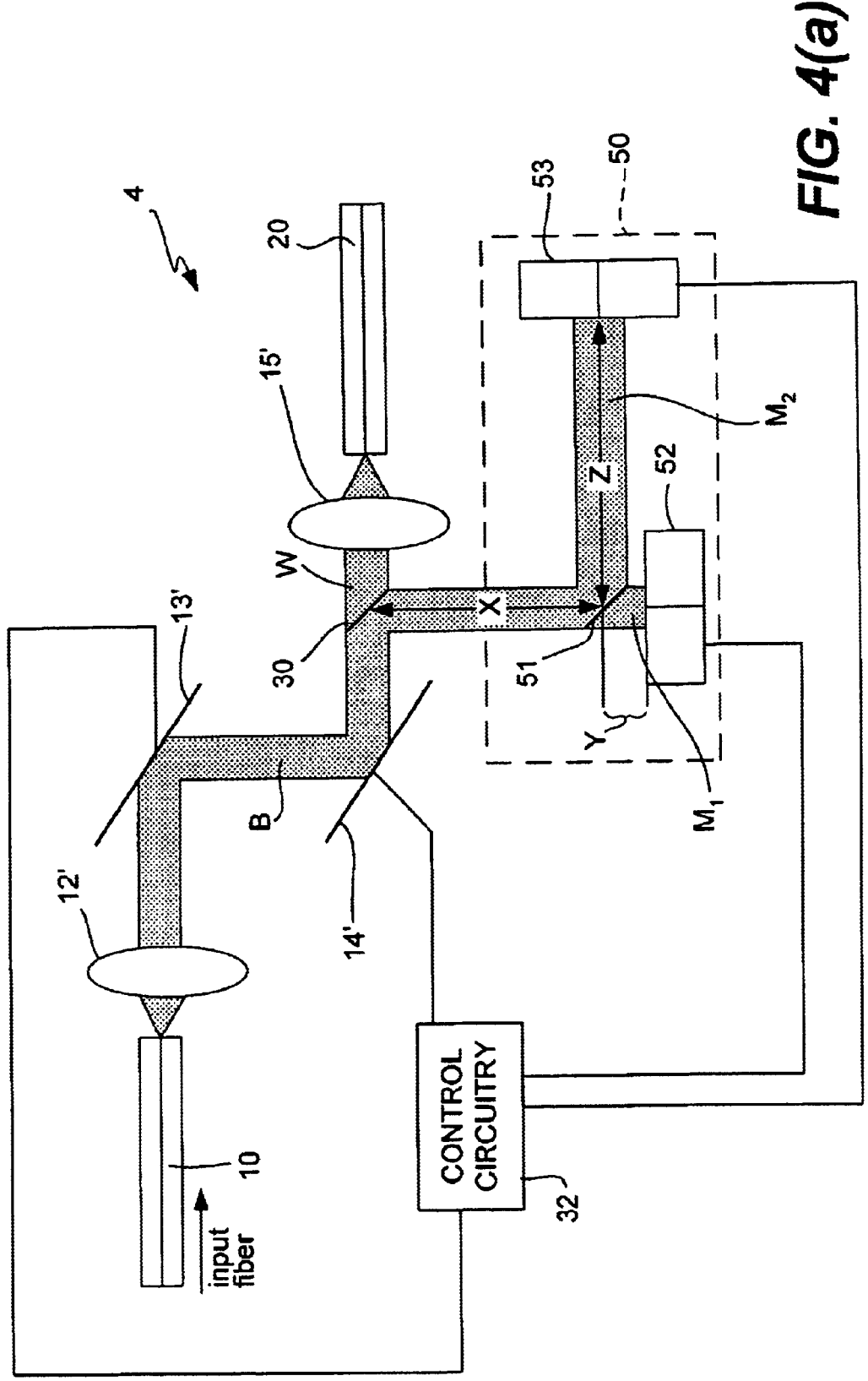

METHOD AND APPARATUS FOR INDIRECT ADJUSTMENT OF OPTICAL SWITCH REFLECTORS

TECHNICAL FIELD

The invention described herein relates to adjusting light beams in optical switches. In particular, methods and apparatus for achieving desired reflector positioning in optical switches through the indirect measurement of light beams.

BACKGROUND

As is well known, fiber optic technology is a rapidly growing field with vastly expanding commercial applicability. As with all technologies, fiber optic technology is faced with certain practical difficulties. In particular, implementation of efficient coupling between an input optical elements and output optical elements in the optical switching elements of an optical network is a significant consideration of designers, manufacturers, and users of optical systems. Optical systems use light beams, usually laser-generated, to carry various types of information. Commonly, these light beams travel through optical fibers or through other optical elements such as optical switches. In optical systems, light beams are directed through complex optical paths with the assistance of optical switching elements. As it happens, losses of optical power in switching elements are a significant concern.

Fiber-to-fiber coupling in an optical switch should be efficient to avoid unnecessary losses in optical power. Coupling efficiency is especially important in optical systems where light beams are subject to reflection as part of the optical switching process. If too much light is lost due to alignment and reflection errors in the switch, the light output from the switch might be insufficient for its intended purpose.

When efficiently coupling, a light beam travelling through an optical switch enters an output optical fiber so that the amount of light transmitted through the fiber is maximized. The most efficient coupling between an optical beam and a fiber occurs when the light beam is centrally positioned on the core of the fiber (on the fiber center) and when the beam enters the fiber at an acceptable angle of entry. Such an acceptable angle of entry is dependent on fiber characteristics, such as, fiber type, size, and cladding. When the light beam enters an output fiber at an acceptable angle of entry and at a central position, an optimal amount of light is transmitted through the output fiber.

However, once positioned on the fiber center at an acceptable angle, the light beam does not always remain in place. Operating conditions which may cause the system to suffer a shock or vibration, for example, can cause the physical components of the optical system to shift, causing the light beam to be offset from the fiber center. Other factors may also cause the light beam position and angle to shift. Changing environmental conditions may result in beam variance from the original position. For example, thermal expansion of a fiber may result in a shift in beam position. Thermal effects may also cause subtle distortion of switch components (like reflector surfaces) resulting in changes in beam angle and position. These and other effects can result in reduced coupling efficiency between the light beam and output fiber. A system and method for efficient coupling must be able to correct offsets due to vibration, thermal expansion, or other causes. Moreover, there can be occasions when it is desirable to intentionally reduce the coupling efficiency between the light beam and output fiber. For example, coupling efficiency can be reduced in order to attenuate optical power in a light beam. The system and method for efficient coupling must be able to accommodate these needs as well.

Previous attempts to solve the foregoing problems have met with mixed success. FIG. 1 shows the inner workings of a conventional optical switching array 1. Briefly, the components include an array of input optical fibers 10, which are positioned and aligned using an input block 11. The light beams exiting the optical fibers 10 are directed through an input lens array 12. The lens array 12, collimates and focuses the optical beams (shown here by a single example optical beam B) such that they are directed onto a first movable reflector array 13, which directs the beams onto a second movable mirror array 14 such that the beams are directed through an output lens array 15 into output channels which correspond to optical fibers 20, which are aligned and positioned in an output fiber block 16. The reflectors of the movable reflector arrays 13, 14 are oriented to direct the optical beams from selected input fibers into selected output fibers. By correctly orienting the mirrors, beams are switched from input fiber to output fiber in order to accomplish the switching function of the switch. The orientation of the reflectors of the movable mirror arrays 13, 14 is controlled by control circuitry (not shown), which moves the individual reflectors of the reflector arrays 13, 14 to accomplish the switching function of the optical switches discussed herein.

A typical example of a movable reflector array 13, 14 is a Micro Electro-Mechanical System (MEMS) reflector array constructed of a plurality of micro-scale movable reflectors formed on a monolithic silicon substrate. Such devices are manufactured by, for example, Analog Devices of Cambridge, Mass., or MCNC of Research Triangle Park, North Carolina.

FIG. 2 is a block diagram illustrating one implementation used to optimize mirror orientation in an optical switch to obtain maximum beam power in an output light beam. The collimator and reflector elements depicted in FIG. 1 are schematically depicted as the switch 17. Optical beams are input into the switch 17 through the input fibers 10. The output optical beams are received by the output fibers 20. Each input fiber 10 is equipped with a detector element 21 that monitors optical power. Similarly, each output fiber 20 includes a similar detector element 22. The outputs from the input detectors 21 and output detectors 22 directly measure optical power in the light beams to position the switch reflectors in order to optimize power. The light detectors 21, 22 directly measure input power and output power and uses this information to adjust the reflectors of the switch path in accordance with power optimization algorithms to maximize the fiber coupled output power. Examples of such power optimization techniques using directly measured light beams is described in detail in the U.S. Patent Application entitled: "Feedback Stabilization of a Loss Optimized Switch", filed on Apr. 30, 2000, Ser. No. 09/548,587, which is hereby incorporated by reference. Although such systems are satisfactory for their intended purpose, improvements can be made.

A disadvantage of such conventional direct measurement devices is that each fiber 10, 20 requires a detector element (e.g., 21, 22) so that input power can be directly compared to output power. Consequently, in a switch having, for example, 256 input and output fibers, 512 such detectors are required (one for each input fiber and each output fiber). Still other approaches use pairs of quadrature detectors for each fiber. Because each quadrature detector comprises four photodetectors, these solutions require eight photodetectors and their supporting circuitry (including amplifiers) per light beam. In addition to the large number of detectors needed by such implementations, the detectors themselves can be quite large, thereby substantially increasing the size of such switches. Also, each splitter/tap is an expensive component requiring individual alignment during manufacture. These factors can significantly increase the cost of such switches. Also, existing switches use a test light beam which is propagated in the direction opposite that of an output beam. This counter propagating light beam is used to align and adjust the beams of the switch and also prevent "false positive" readings generated by stray light in the switch. The need for a test beam increases cost and complicates the system. As a result, it is desirable to develop methods and apparatus for optimizing light beam power in optical switches which do not rely on such direct measurements of optical power and do not require a counter propagating light beam to align and adjust the beams of a switch and does not generate false positive readings.

Therefore, an improved system and method for adjusting light beams in an optical switch using indirect measurement of light beams is needed.

SUMMARY OF THE INVENTION

In accordance with the principles of the present invention, an apparatus and method for indirectly monitoring and adjusting optical beams by the detection and indirect measurement of at least one monitoring beam and using such measurements to adjust the reflectors of an optical switch in order to obtain output beams having the desired optical characteristics is disclosed.

An embodiment of the present invention splits a light beam into a working beam and at least one monitoring beam. The at least one monitoring beam is measured and used to adjust reflectors such that the working beam is adjusted and maintained having the desired optical properties without the need to interfere with the working beam signal.

A method embodiment for indirectly measuring and adjusting light beams output from an optical switch comprises receiving, by the optical switch, an input light beam, switching of the input light beam, such that the input light beam is optically coupled to any of a plurality of selected output channels, and, after switching, splitting the light beam into at least one monitor beam and a working beam, detecting the optical power of at least one monitor beam, and based on the detected optical power of the at least one monitor beam, adjusting the working beam until it exhibits the desired optical characteristics, and outputting the working beam from the switch. Further method embodiments include adjusting the working beam until it exhibits optimal power. Still other method embodiments direct the at least one monitor beam to a position remote from the working beam where it is detected. Still other method embodiments split the input beam such that the at least one monitor beam and the working beam are substantially parallel to each other.

An optical switch embodiment comprises an array of optical input channels each capable of carrying an associated input light beam, an array of output channels, an array of beam monitoring elements, a switching array for coupling selected input channels to selected output channels enabling the switching of each input light beam to any one of a plurality of output channels, and a beam splitter optically interposed between the switching array and the array of output channels, and positioned to receive light beams from the switching array such that a portion of the light from the light beams is directed as monitor beams onto the array of beam monitoring elements, and such that another portion of the light from the light beams is directed to the array of output channels as working beams. Beam monitoring elements measure the monitor beams to provide optical information used for adjusting the switching array such that the working beams enter the output channels having desired optical characteristics.

Yet another embodiment comprises an array of input channels each capable of carrying an associated light beam, an array of output channels, an array of beam monitoring elements, a switching array including reflector arrays for switching selected light beams received from the input channels into any of a selected plurality of output channels as output beams, rhomboid prism assemblies positioned to receive the output beams from the switching array such that a portion of the light from the plurality of output beams is reflected in the form of monitor beams, and such that another portion of the light from the plurality of output beams passes through the rhomboid prism assemblies as working beams, wherein the monitor beams are reflected such that the monitor beams and the working beams emerge from the rhomboid prism assemblies as substantially parallel beams, wherein the working beams are directed into the plurality of output channels and wherein the monitor beams are directed into the beam monitoring elements wherein they are measured and used to provide information for adjusting the working beam.

Another embodiment comprises a fiber array having a plurality of input fibers and a plurality of output fibers. The input fibers and output fibers are capable of carrying an associated light beam. The embodiment further comprises an array of beam monitoring elements located physically apart from the fiber array, a switching array comprising, in combination, a plurality of first movable reflectors, a plurality of second movable reflectors, a stationary reflector; and control circuitry operating such that a light beam input into the switching array from an input fiber can be switched to a selected output fiber. The embodiment also includes a beam splitter interposed between the switching array and the fiber array such that a portion of the light from the light beams exiting the switching array is reflected by the beam splitter as monitor beams onto the physically separate beam monitoring elements and such that another portion of the light from the light beams exiting the switching array passes through the beam splitter as working beams which enter the output fibers; and wherein the beam monitoring elements measure the monitor beams and provide optical information to the control circuitry for adjusting the switching array such that the working beams enter the output fibers having the desired optical characteristics.

These and other aspects and advantages of the invention will become apparent from the following detailed description and accompanying drawings which illustrate, by way of example, the principles of the invention.

BRIEF DESCRIPTION OF THE DRAWINGS

For a fuller understanding of the invention, reference is made to the accompanying drawings in the following Detailed Description. In the drawings:

FIG. 3 is a top down view of an optical switch and detector embodiment illustrating the principles of indirect reflector positioning in accordance with the principles of the present invention.

FIGS. 4(a) and 4(b) are top down views of optical switch and detector embodiments illustrating the principles of indirect reflector positioning using quadrature detectors in accordance with the principles of the present invention.

Figure 1:
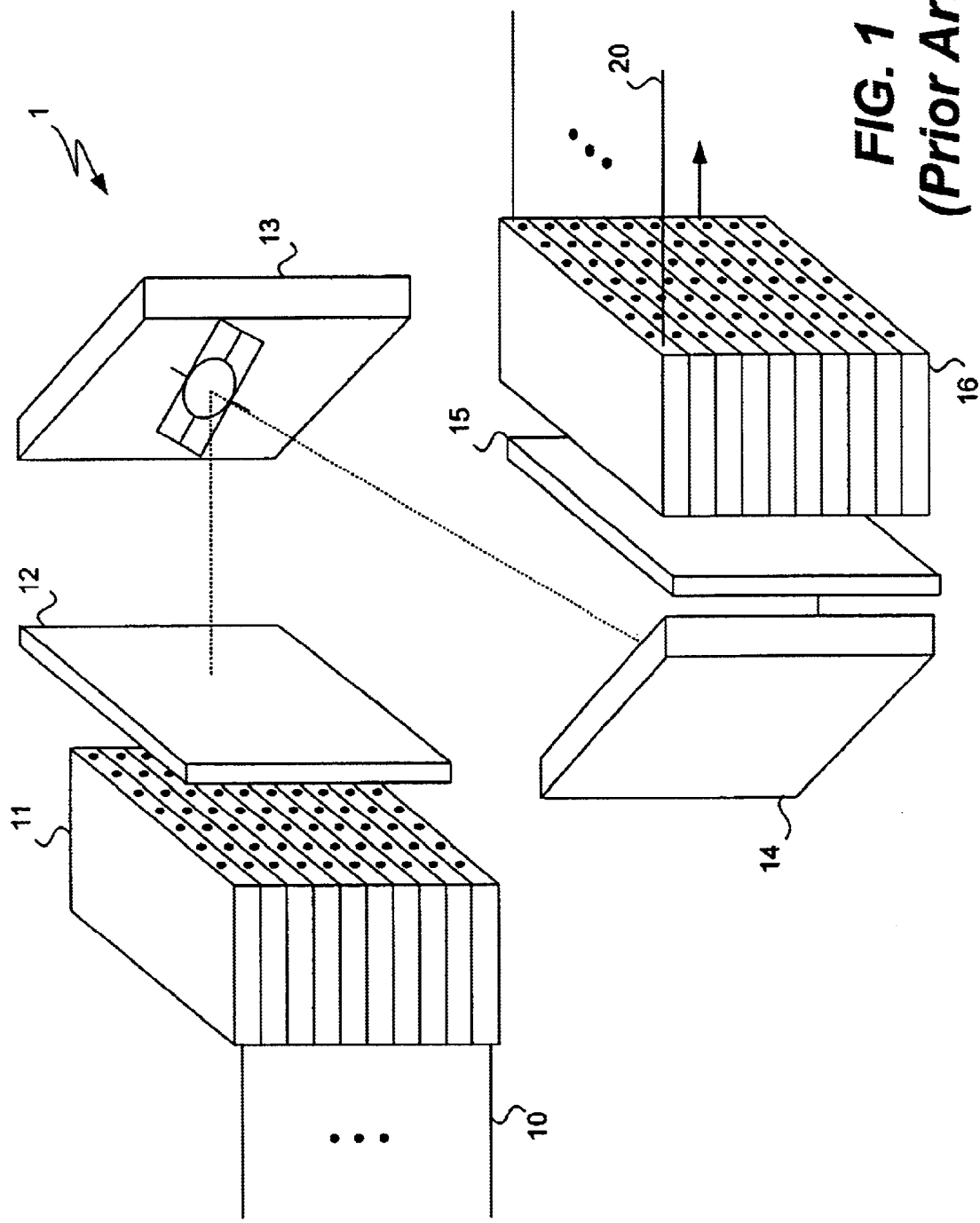
FIG. 1 is a perspective view of an optical switch embodiment.
Figure 1B:
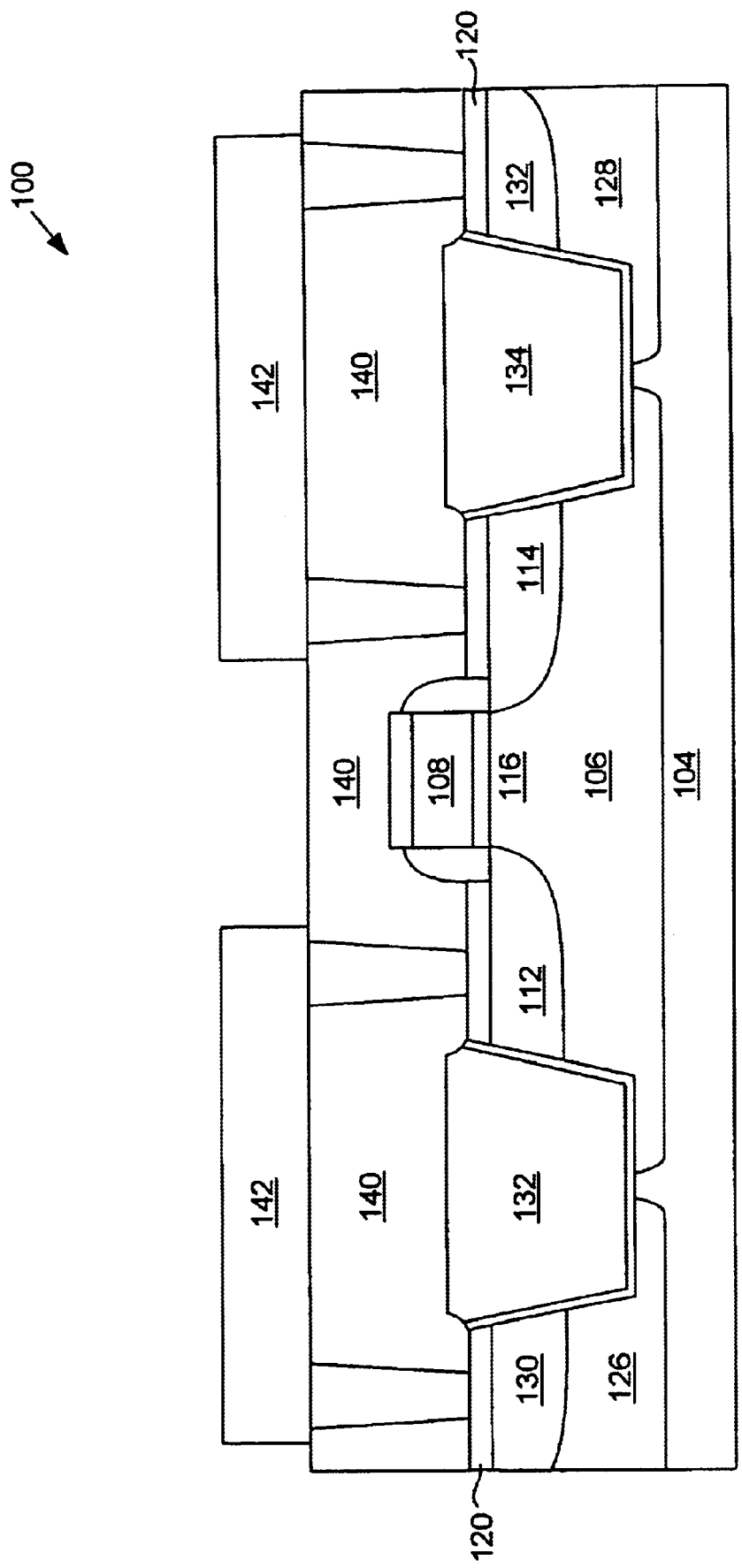
Figure 2:
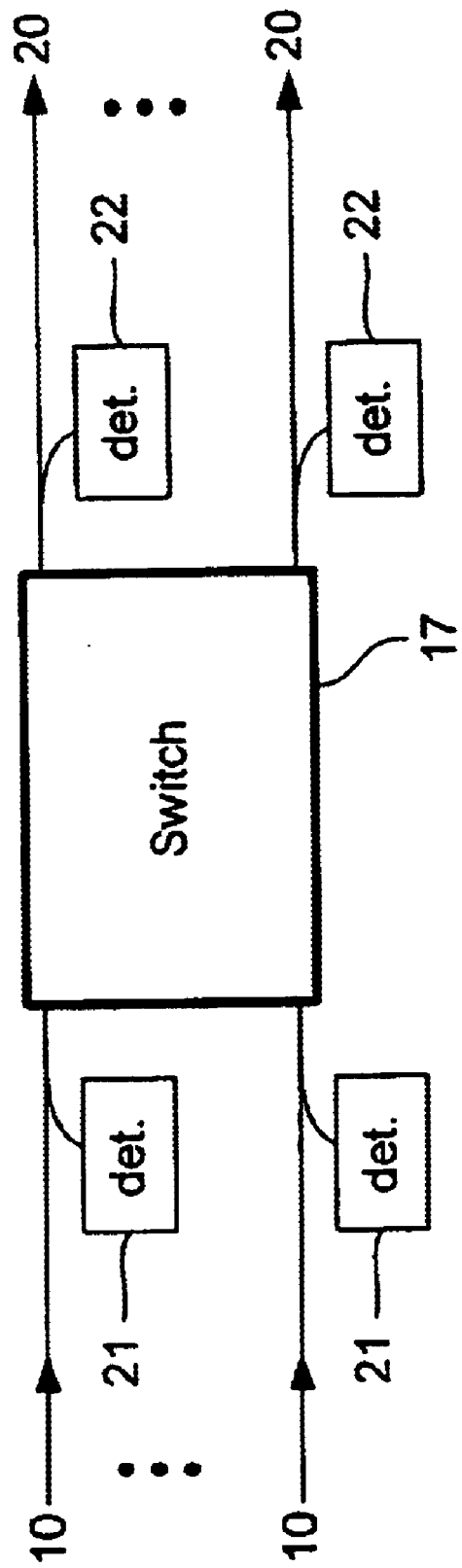
FIG. 2 is a block diagram of an embodiment of an optical cross-connect switch using direct measurement of fiber coupled optical power to adjust beam position in an optical switch.

Reference numerals refer to the same or equivalent parts of the present invention throughout the several figures of the drawings.

DETAILED DESCRIPTION OF THE DRAWINGS

The present invention has been particularly shown and described with respect to certain preferred embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

The embodiments of the present invention are for indirectly monitoring and adjusting optical beams in an optical switch. The embodiments of the present invention include methods and apparatus for generating a working beam and at least one corresponding monitoring beam from an input light beam. The working beam can then be indirectly monitored and adjusted based on measurements of the corresponding monitoring beam. Monitoring beam information can be used by control systems of the optical switch to adjust the switch reflectors so that working beams can be output having the desired optical properties (e.g., the working beam is output having an optimal power level). Thus, the embodiments of the invention monitor and adjust working beams using optical power readings taken from monitor beams, thereby indirectly enabling the indirect monitoring and adjustment of working beams output from a switch.

I. One Embodiment Uses Measurements Of Monitor Beam Power To Adjust The Working Beam.

In one embodiment, an optical beam is split into a working beam and a monitoring beam. The optical power of the monitoring beam is measured and used to determine whether the corresponding working beam is entering an output fiber at the right place (positional alignment) and at the right angle (angular alignment). One particular advantage of such embodiments is that they only need to measure monitoring beam power, no other parameters need be measured.

FIG. 3 depicts a switch embodiment 3 in accordance with the principles of the present invention. Although FIG. 3 illustrates certain principles of the invention with respect to a single input fiber and a single output fiber, the inventors specifically contemplate that the principles can be applied to large fiber array structure having many input and output fibers, as well as arrays of switching reflectors.

With continuing reference to FIG. 3, an input fiber 10 directs an optical beam B through an input lens 12' onto a movable input reflector 13' where it is directed onto a movable output reflector 14'. The beam B is directed from the movable output reflector 14' through an output lens 15' onto output fiber 20. Thus far, the embodiment described characterizes a conventional switching array. However, the depicted embodiment 3 includes a beam splitter 30 positioned in the free space between the movable output reflector 14' and the output lens 15'. The beam splitter can be a partially reflective surface 30 interposed between the movable output reflector 14' and the output lens 15'. The beam splitter 30 is positioned such that the optical beam B has been reflected by both reflectors 13', 14'. The partially reflective surface 30 is positioned such that a fraction of the light beam is directed into a beam monitoring element 40. This is a monitoring beam M. At the same time, the majority of the light beam passes through the partially reflective surface 30 through the output lens 15' and into the output fiber 20. This is a working beam W. Only a very small fraction of the optical power contained in the light beam B is required by the beam monitoring element 40. Thus, by monitoring the monitoring beam M, the working beam W can continue in uninterrupted operation allowing indirect monitoring of the optical beam. The beam monitoring element 40 includes a monitor lens 41, which has similar optical characteristics to that of the output lens 15'. The monitor lens 41 is positioned such that the monitor beam M is directed from the partially reflective surface 30 through the monitor lens 41 into a monitor fiber 42, which outputs the monitor beam M onto a detector element 43. The detector element need measure only the optical power of the monitor beam M. The detector element 43 provides control circuitry 32 of the optical switch with optical power information, which can be used by the control algorithms of the control circuitry 32 to adjust the reflectors (e.g., 13', 14') of the switch, to produce a working beam W having a desired power level. The control circuitry 32 accomplishes this by moving the movable input reflector 13' and movable output reflector 14' until a desired level of optical power is achieved in the working beam W. An accurate way to position the reflectors is disclosed in the Calient Networks patent application entitled "Feedback Stabilization of a Loss Optimized Switch", filed on Apr. 30, 2000, U.S. patent application Ser. No. 09/548,587, which has been incorporated by reference. It is to be noted that the most common use of such monitoring is to optimize the optical power in the beam received by the output fiber 20 (i.e., the working beam W). However, other levels of optical power may be desired for a variety of reasons, not the least of which is power equalization. In a preferred embodiment, the distance D between the partially reflective surface 30 and the face of the output fiber 20 and the distance D' between the partially reflective surface 30 and the output surface of the monitor fiber 42 is equal. In such circumstances, there can be a one-to-one correlation between optical power in the monitor fiber 42 and the optical power in the output fiber 20. However, given the space constraints in optical switching devices, the output fiber 20 and the monitor fiber 42 may be positioned at different distances away from the partially reflective surface 31. In such cases, a predictable relationship between the light beam in the output fiber 20 and in the monitor fiber 42 can be determined. Typically, the switch will be calibrated to reflect the relationship between the light power in the output fiber 20 and the monitor fiber 42. Once calibrated the control circuitry used to control reflector position and orientation is used to adjust the position and angle of the working beam.

It should be noted that when the optical path for the monitor beam M is not an exact replica of the working beam W optical path there will be some difference between the monitor power values and the actual working power values. The nature of the difference is dependent on differences in the optical beam paths. Because the differences between the optical beam paths is known, the monitor beam M and the working beam W can be readily correlated and calibrated to account for the differences as described later. As such the monitor beams M can be used to provide an effective model of the optical power in an output fiber.

Among the advantageous features of the embodiment depicted in FIG. 3 are that each optical beam being monitored only requires the presence of a single detector element. Compared to existing devices, which include from between 2–8 detector elements per light beam and their supporting circuitry, the present embodiment is vastly simplified. Additionally, the present embodiments dispense with the need for test beams. Also, a single partially reflective surface can be positioned in the free space between the switching element and the output channels in order to accomplish beam splitting for each fiber in the switch. In contrast conventional direct measurement systems require a splitter or tap positioned on each fiber. The cost savings incurred through these simplifications can be significant.

II. Another Embodiment Uses Measurements Of At Least One Monitor Beam M To Adjust The Position And Beam Angle Of Entry Of A Working Beam W Into An Output Fiber.

In another embodiment, an optical beam is split into a working beam and a monitoring beam. The monitoring beam is divided into a pair of monitoring beams. The optical power and position of the monitoring beams is measured and used to determine whether the corresponding working beam is entering an output fiber at the right place (positional alignment) and at the right angle (angular alignment).

In one embodiment, position sensitive detectors are used to determine monitor beam position and angle. This monitor beam angle and position is correlated with the angle and position that a corresponding working beam enters an output fiber. Thus adjustments of the monitor beam lead to corresponding adjustments in the working beam.

The embodiment depicted in FIG. 4(a) makes use of a pair of position sensitive photo-detectors to determine beam position and angle of entry of a working beam into an output fiber. The purpose of this embodiment is to detect and measure optical beam characteristics after the beam has passed through all the movable reflectors of the system and determine if there is any beam positional misalignment or angular misalignment with respect to an output fiber. After passing through all the movable reflectors of the system, an optical beam is split by at least one beam splitter into a working beam and at least one monitor beam. This provides a working beam and at least one monitoring beam such that light from the at least one monitoring beam can be measured by two photo-detectors. In one preferred embodiment, two monitoring beams are used. Each of the monitoring beams are directed toward position sensitive detectors positioned such that each monitoring beam travels a different distance from a first beam splitter to a respective photo-detector. The measured data from the photo-detectors is used to adjust the reflectors to adjust the working beam.

The embodiment 4 depicted in FIG. 4(a) includes an input fiber 10 which directs a light beam B through an input lens 12' onto movable reflectors 13', 14' through an output lens 15' into output fiber 20. A partially reflective surface 30 is interposed between the output reflector 14' and the output mirror 15'. As with the embodiment of FIG. 3, the partially reflective surface 30 reflects a first part of the optical beam B into a beam monitoring element 50 while the other part of the beam (the working beam W) is input into the output fiber 20.

The first part of the optical beam B is reflected into the beam monitoring element 50 where it is directed onto a beam splitter 51, which transmits a transmitted portion of the first part of the optical beam B through the beam splitter 51 (as first monitor beam $M_1$) and reflects a second portion of the first part of the optical beam B (as second monitor beam $M_2$). A typical example is a 50/50 beam splitter wherein 50% of the light contacting the beam splitter 51 is reflected and 50% of the light is transmitted through the beam splitter 51. The inventors contemplate that the embodiments of the invention can be practiced using beam splitters 51 other than 50/50 beam splitters. The first monitor beam $M_1$ is detected by a first position sensitive detector 52 and the second monitor beam $M_2$, which has been reflected, is detected by a second position sensitive detector 53. Information from the first position sensitive detector 52 and the second position sensitive detector 53 are used by the control circuitry 32 of the switch to adjust the position of the reflectors 13' and 14'.

In the preferred embodiment, the optical paths of each of the beams are of different lengths. In the depicted embodiment, each of the beams follow an optical path that includes a first path distance X. As for the first monitor beam $M_1$ a second path distance Y which terminates at the first position sensitive detector 52. And for the second monitor beam $M_2$ a third path distance Z which terminates at the second position sensitive detector 53. Thus, the optical path for the first monitor beam $M_1$ from partially reflective surface 30 to position sensitive detector 52 is distance X+Y. And the optical path for the second monitor beam $M_2$ from partially reflective surface 30 to position sensitive detector 53 is distance X+Z. In this embodiment, the length of the optical path of the first beam (X+Y) is different from the distance of the optical path of the second beam (X+Z). Measurements taken using the first position sensitive detector 52 can be used to determine whether the working beam is misaligned with respect to the output fiber 20 (positional misalignment). For example, to determine whether the beam W is centered on an output fiber 20. Whereas, the combination of measurements taken by the first position sensitive detector 52 and the second position sensitive detector 53 can be used to determine if the working beam W is entering the output fiber 20 at the wrong angle (angular misalignment). For example, if working beam W strikes the fiber 20 at an entry angle such that the beam can only propagate a short distance down the length of the output fiber, it is said to be subject to angular misalignment.

Figure 4B:
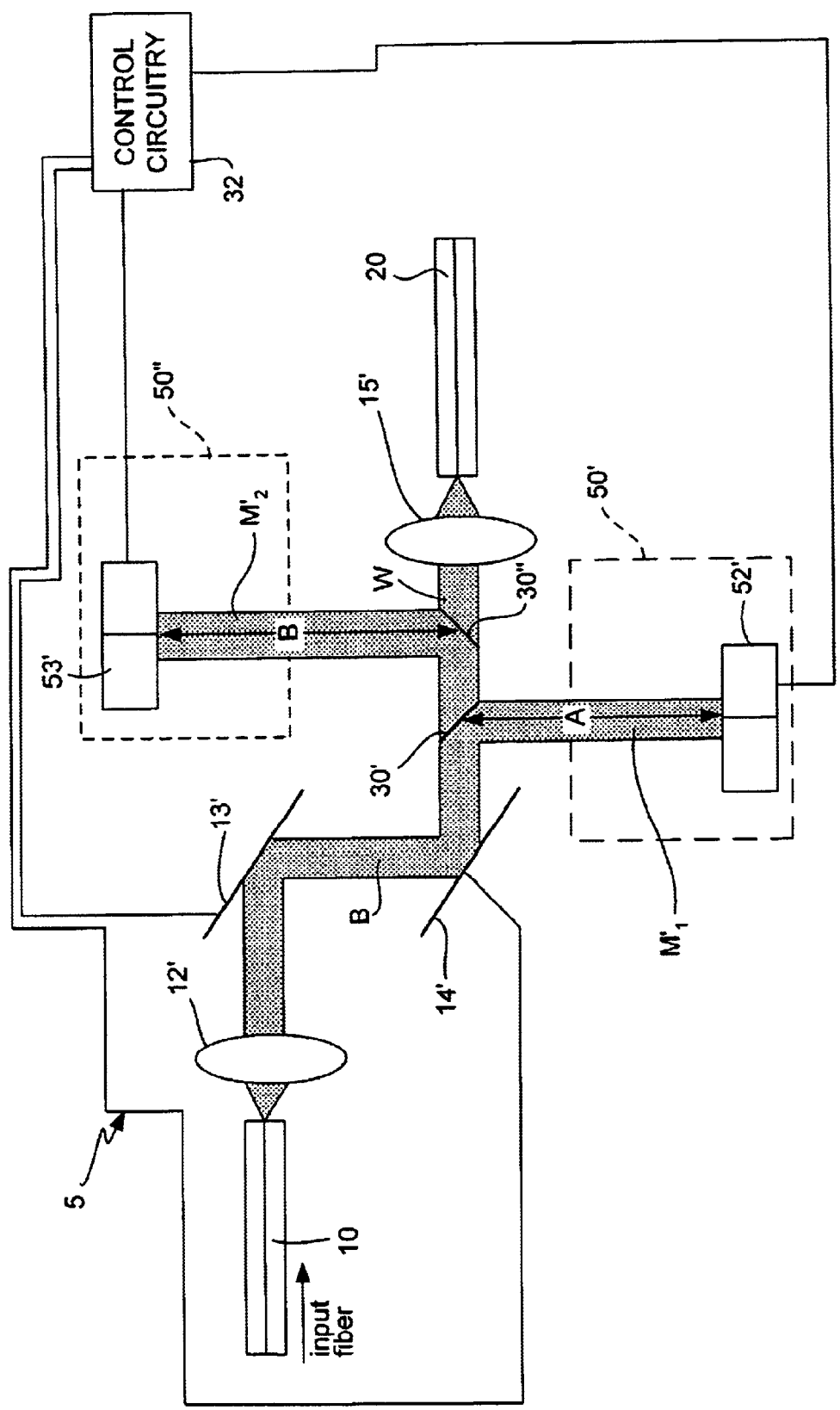

Yet another embodiment 5 is depicted in FIG. 4(b) which includes an input fiber 10 which directs a light beam B through an input lens 12' onto movable reflectors 13', 14' through an output lens 15' into output fiber 20. Also, included is a beam monitoring element 50', 50". A first partially reflective surface 30' is interposed between the output reflector 14' and the output mirror 15'. In addition, a second partially reflective surface 30" is interposed between the first partially reflective surface 30' and the output mirror 15'. The first partially reflective surface 30' reflects a first portion (referred to herein as first monitor beam $M'_1$) of the optical beam B into a first part of a beam monitoring element 50' while the remaining portion of the beam B passes through the first partially reflective surface 30'. The remaining portion of the beam impinges on the second partially reflective surface 30" which reflects a second portion (referred to herein as second monitor beam $M'_2$) of the optical beam B into a second part of a beam monitoring element 50". The unreflected portion of the beam B passes through the second partially reflective surface 30" as the working beam W which is input into the output fiber 20. It should be noted that in preferred embodiments, first and second beam splitters 30', 30" are highly transmissive, each reflecting only about 1–2% of the incident beam B. The inventors contemplate that the embodiments of the invention can be practiced using beam splitters 30', 30" that reflect greater 2% of the incident beam B.

The first monitor beam $M'_1$ is reflected into the first part of a beam monitoring element 50' where it is detected by a first position sensitive detector 52'. Also, the second monitor beam $M'_2$ is reflected into the second part of a beam monitoring element 50" where it is detected by a second position sensitive detector 53'.

The optical path of each of the beams $M'_1$, $M'_2$ extends from the first beam splitter 30' its respective position sensitive detector 52', 53'. In preferred embodiment, the optical path length A of the first monitor beam $M'_1$ and the optical path length (B'+B") of the second monitor beam $M'_2$ are of different lengths. However, it is possible to construct embodiments where the optical path lengths of each of the beams $M'_1$, $M'_2$ is the same.

In this embodiment, measurements taken using the first position sensitive detector 52 and the second position sensitive detector 53 are input to the control circuitry 32 which adjusts the position of the reflectors 13', 14' to obtain a desired working beam W. The measurements taken by the first position sensitive detector 52 can be used to determine positional misalignment in a working beam W. Whereas, the combination of measurements taken by the first position sensitive detector 52 and the second position sensitive detector 53 can be used to determine angular misalignment of the working beam W, with respect to an output fiber.

The position sensitive detectors 52, 53 (also 52', 53') are position sensitive photodetectors. Such detectors encompass a wide range of position sensitive light detection devices. Typical examples include, but are not limited to, so-called quadrature detectors, CCD detectors, and also CMOS detectors (such as discussed in U.S. Pat. No. 5,461,425 to Fowler, et al.). The following discussion pertains to position sensitive detectors that comprise quadrature photo-detectors which are used to determine beam position and angle of entry of the beam into an output fiber. The methods of making and using such quadrature detectors is known by those having ordinary skill in the art. However, a brief description of their function will serve to accelerate and clarify our discussion of their use here.

Figure 5:
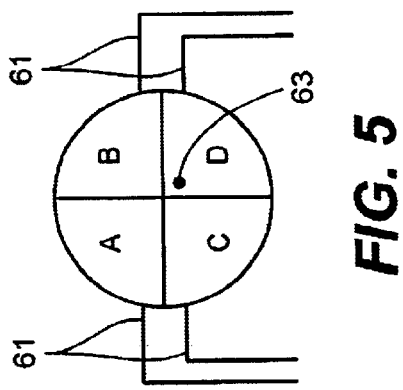
FIG. 5 is an illustration of a quadrature detector embodiment which can be incorporated into an optical cross-connect (switch) of the present invention.

FIG. 5 depicts and embodiment of a quadrature detector 60, which is suitable for use, for example, in the beam monitorings element 50, 50', 50" of FIGS. 4(a) and 4(b). The quadrature detector 60 includes a single photodetector divided into four detector elements A, B, C, D, which may be constructed by processes and from materials known to those having ordinary skill in the art. When light impinges on the detector elements of the quadrature detector, electrical current is produced. The magnitude of the current bears a relationship to the intensity of the light impinging on the photodetector. The current produced by the photodetectors is measured and processed to determine the location of an optical beam on the quadrature detector 60. Typically, the current produced by the photodetectors is conducted away from the detector using conductive lines 61 which can be connected to the control circuitry (e.g. 32) of the optical switch. The current from the detector elements A, B, C, and D is processed to determine the position of the beam. One example of a method used to determine beam position is as follows: In order to determine the left/right (L/R) position of an optical beam, the current $I_A$ produced from detector A is summed with the current $I_C$ produced by photodetector C, and the current $I_B$ produced by photodetector B is summed with the current $I_D$ produced by photodetector D. The two sums are subtracted from each other as shown in the equation below.

$(I_A+I_C)-(I_B+I_D)=L/R$ Position Current

If the L/R position current is positive, it is known that the optical beam is too far to the left. And, conversely, if the L/R position current provides a negative value, it is known that the beam is too far to the right.

The up and down positions of the beam can also be determined with the quadrature detector. For example, in accordance with the following equation:

$(I_A+I_B)-(I_C+I_D)=$Up/Down Position Current

If the up/down position current is positive, the beam is too high. Conversely, if the up/down position current is negative, then the beam is positioned too far down. If the beam 63 is used as an example, the left/right position current will be negative and the up/down position current will also be negative, which will allow the system to detect the fact that the beam is in the quadrant detected by detector D. Based on this information, adjustments in movable reflector positions can be made in order to move the beam 63 higher and to the left. This is how a photodetector such as the first position sensitive photodetector 52 in the beam monitoring element 50 functions to center an optical beam in an optic fiber to correct positional misalignment.

Referring again to FIGS. 4(a) and 4(b), it is also important to control the entry angle at which a light beam enters an output fiber 20. In conjunction with the first quadrature detector 52, a second quadrature detector 53 can be used by the beam monitoring element 50 to determine the entry angle of the light beam into the output fiber 20. This information can then be used to move the movable reflectors to improve the angle of entry of the light beam into the output fiber 20 (i.e, to correct angular misalignment in the beam entry angle).

Figure 6A:
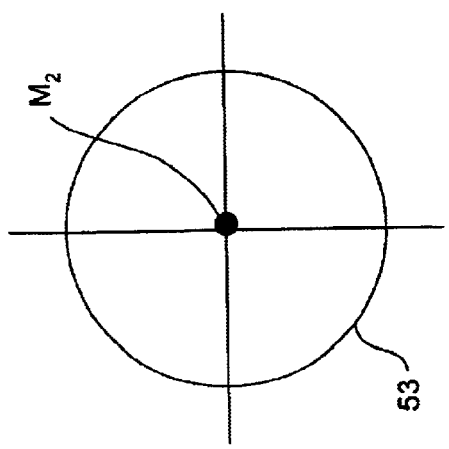
FIGS. 6(a)–6(d) are depictions of beam position on quadrature detectors of switch embodiments in accordance with the principles of the present invention
Figure 6B:
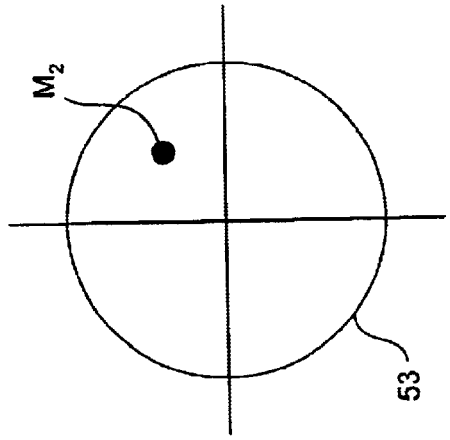
Figure 6C:
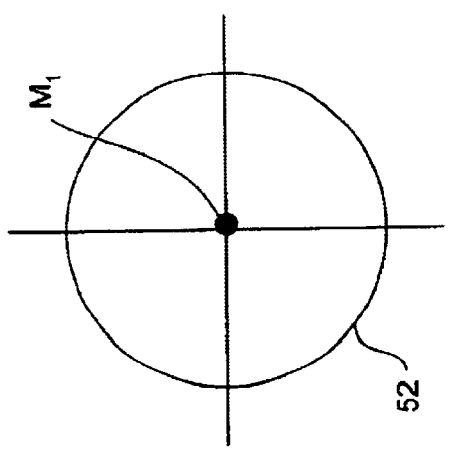
Figure 6D:
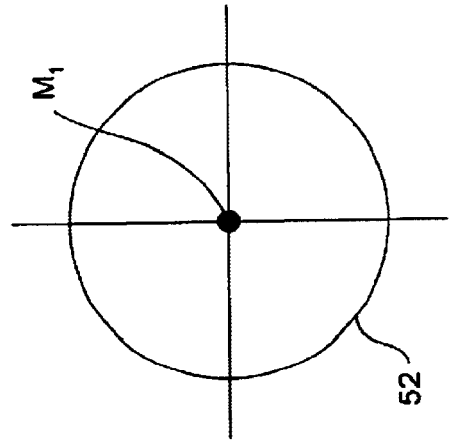

FIGS. 6(a)–(d) illustrate how the position sensitive detectors 52, 53 of, for example, FIG. 4(a) of the beam monitoring element 50 cooperate to correct beam angle misalignment. The optical paths from the beam splitter (i.e., beam splitter 30 of FIG. 4(a)) to each position sensitive detector 52, 53 are of a different length (See, discussion with respect to FIG. 4). By examining the light beam positions as they strike the position sensitive detectors 52, 53, the light beam entry angle into the output fiber 20 can be determined. For example, referring to FIG. 6(a), a first monitor beam $M_1$ is shown as it impinges the first position sensitive detector 52 of the beam monitoring element 50. As previously explained, a portion of the beam is reflected by the beam splitter 51 (as second monitor beam $M_2$) onto the second position sensitive detector 53. Referring to FIG. 6(b), it can be seen that the second monitor beam $M_2$ position as it contacts the second position sensitive detector 53 is substantially the same as the beam position depicted in FIG. 6(a). Due to the substantially similar positions of the beams $M_1, M_2$ as they impinge upon the position sensitive detectors 52, 53, it can be determined that misalignment of the entry angle of the light beam into the output fiber is relatively slight. However, FIGS. 6(c) and 6(d) illustrate a different situation. An initial position is depicted as the first monitor beam $M_1$ strikes the first position sensitive detector 52 (as shown in FIG. 6(c)). As with the beams depicted in FIGS. 6(a) and 6(b), the beam splitter 51 reflects a portion of the first monitor beam $M_1$ onto the second position sensitive detector 53 (as second monitor beam $M_2$) where $M_2$ is detected. FIG. 6(d) shows that second monitor beam $M_2$ which has a substantially different position when compared to that of first monitor beam $M_1$ in FIG. 6(c). The fact that there is not complete agreement between the positions of $M_1$ and $M_2$ indicates that the light beam is entering the output fiber 20 at some angle. Based on the distance between the beam splitter 51 and the second position sensitive detector 53 and the optical characteristics of the system and output fiber 20, a determination can be made as to whether the entry angle is acceptable. If not, the movable reflectors 13', 14' can be adjusted to change the angle of entry to a more suitable angle. One advantage of the embodiment of FIG. 4(a) is that, unlike conventional implementations, it does not require the use of a test beam.

Other embodiments can include varying beam splitter and detector positions, as well as varying geometries for the components. All that is required is that the optical beam B pass through all of the movable reflectors (here, 13', 14') and that distance from the partially reflective surface 30 to each of the detectors (here, 52, 53) be of different lengths.

III. Other Embodiments Use Rhomboid Prisms To Split Optical Beams Into Working And Monitoring Beams.

Figure 7A:
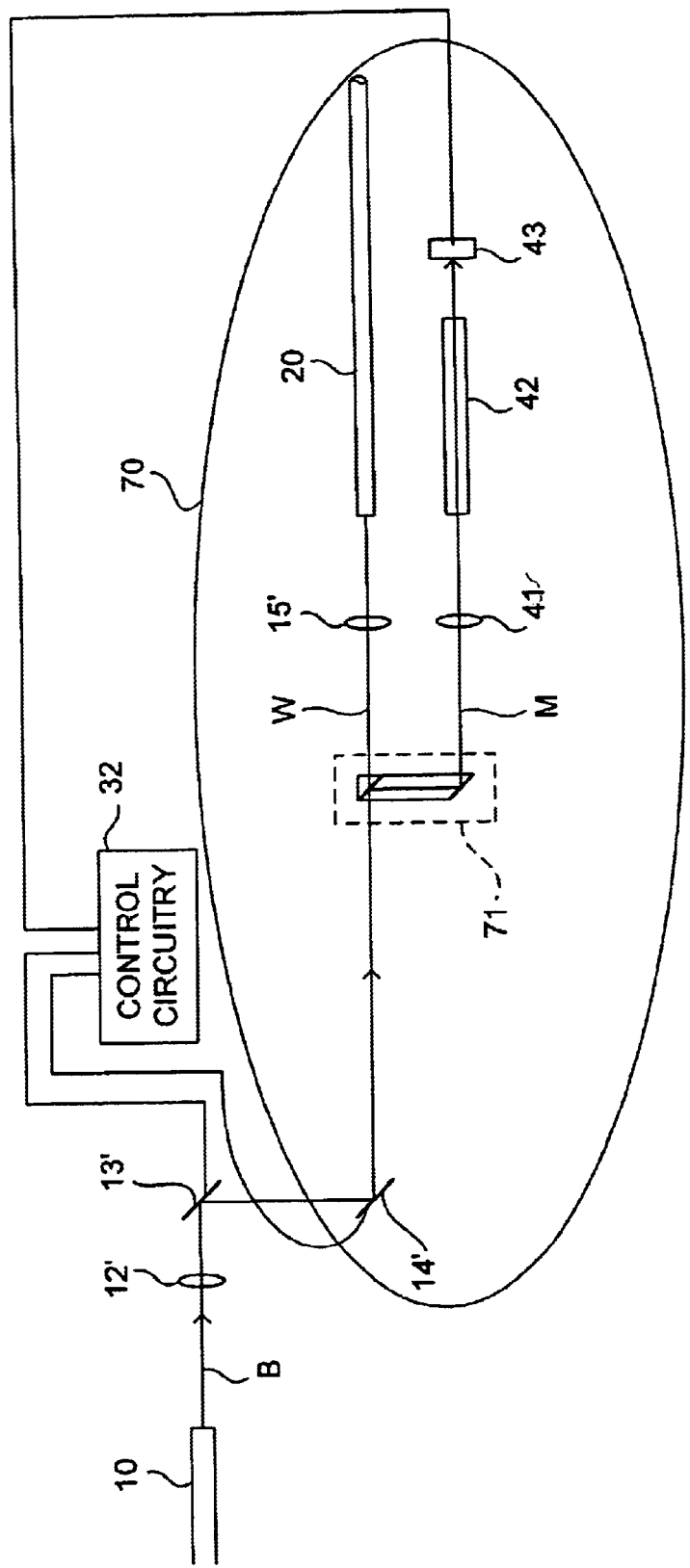
FIGS. 7(a)–7(d) are depictions of another cross-connect switch embodiment in accordance with the principles of the present invention.

FIGS. 7(a)–7(d) illustrate other advantageous embodiments of the present invention which incorporate rhomboid prisms into a beam splitting apparatus that splits the optical beam into working and monitoring beams. FIG. 7(a) is a depiction of certain aspects of the invention as applied to a single input fiber and a single output fiber. The inventors contemplate that preferred embodiments, which incorporate these same principles, will do so in conjunction with arrays of fibers and other optical components rather than on single fibers.

FIG. 7(a) illustrates a top down view of a switch embodiment incorporating certain principles of the present invention. An input fiber 10 introduces a light beam B into the optical switching environment. The beam passes through an input lens 12' onto a first (or input) movable reflector 13', which deflects the beam onto a second (or output) movable reflector 14', where it is reflected into a rhomboid prism assembly 71 which splits the beam into a monitor beam M and a working beam W. In the preferred embodiments, the size and dimensions of the rhomboid prism assembly 71 are chosen such that the monitor beam M and the working beam W emerge from the rhomboid prism assembly 71 substantially parallel to each other. Typically, the working beam W contains 90–99% of the optical power of the original light beam B, with the remaining optical power residing in the monitor beam M. The working beam W is directed through an output lens 15' into an output fiber 20. The monitor beam M is directed through the rhomboid prism assembly 71 such that it is directed into a beam monitoring structure. Here, the beam monitoring structure (or beam monitoring element) shows a monitor beam M passing through a monitor lens 41 into a monitoring fiber 42, which directs the monitoring beam M into a detector element 43 (e.g., a photodetector such as a photodiode). The detector element 43 provides information to the control circuitry 32, which controls the reflectors 13', 14'. The oval 70 contains a beam monitoring structure, which is depicted in greater detail in FIG. 7(b).

Figure 7B:
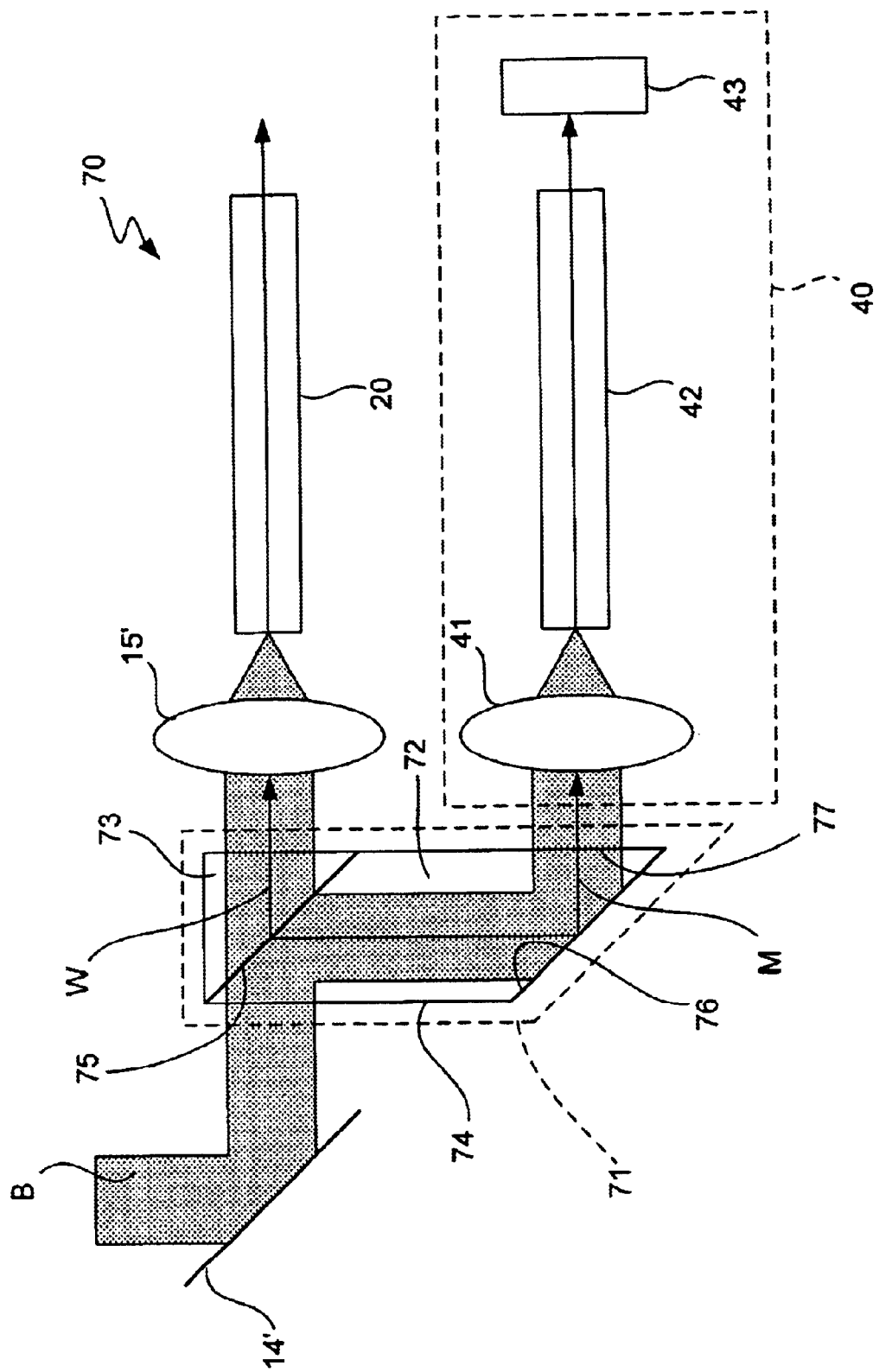

FIG. 7(b) depicts in greater detail the beam monitoring structure 70 shown in FIG. 7(a). In an optical switching environment, the light beam B is reflected off the second movable reflector 14 into a rhomboid prism assembly 71. The rhomboid prism assembly 71 can be comprised of two distinct elements. One element is a rhomboid prism 72, which is positioned adjacent to a triangular prism 73. The rhomboid prism includes a first surface 70, a second surface 75, a third surface 76, and a fourth surface 77. The light beam B enters the first surface 74 of the rhomboid prism and is reflected by the second surface 75. Typically, the second surface 75 is a partially reflective surface (for example, achieved by using an appropriate optical coating), which transmits the majority of the optical power of the light beam B through the surface 75. This transmitted light is referred to as the working beam W. The working beam passes through the triangular prism 73 and enters the output lens 15', which directs the working beam W into the output fiber 20. Also, the rhomboid prism reflects another portion of the light beam as a monitor beam M. The monitor beam M is reflected off the second surface 75 of the rhomboid prism 72 and directed onto the third surface of the rhomboid prism 76, which reflects the beam out of the rhomboid prism 72 through the fourth surface 77 into a beam monitoring element. The depicted embodiment shows a beam monitoring element including a lens 41, which directs the beam M into a monitor fiber 42. The monitor beam M exits the monitored fiber 42, where it is measured by a detector element 43. The monitor lens 41, the monitor fiber 42, and the detector 43 comprise a beam monitoring element 40. The second and third surfaces of the rhomboid prism can be treated with appropriate reflective coatings (which are generally known to those skilled in the art), which in the case of the second surface 75 is only partially reflective, and in the case of the third surface 76 is completely reflecting. Also, the angles of the rhomboid prism can be chosen to provide the desired reflective qualities.

The foregoing rhomboid prism embodiments are advantageous for several reasons. First, they are relatively simple to construct and align. Second, because the working beam W and the monitored beam M can be output from the rhomboid prism as substantially parallel beams, the optical characteristics of the monitored beam M very closely and accurately model the characteristics of the working beam W. Consequently, the monitor beam M can more easily be calibrated to the working beam W. Thus, the information received from the monitored beam M can be used more easily to manipulate the position of the first and second movable reflectors 13', 14' to obtain the desired optical beam profile in the output beam. Although implemented using a rhomboid prism, the advantages of the rhomboid prism could be achieved using other optical arrangements producing parallel working and monitor beams.

As previously discussed, the preferred embodiment of optical switches incorporates the concepts of the invention into array systems, which include arrays of movable layers, arrays of input fibers, arrays of output fibers, arrays of lenses, arrays of rhomboid prisms, etc. FIG. 7(c) depicts a portion of an embodiment of one such an optical switch. A plurality of optical beams B are reflected from a switching array. The beams are directed onto an array of rhomboid lens assemblies 71, where they are split into groups of working beams and monitoring beams. The working and monitoring beams are passed into a lens array, which includes a plurality of output lenses 15' and monitor lenses 41 (which in preferred embodiment are identical lenses). The monitored and working beams are then passed into an array of optical fibers. Typically, the optical fibers are aligned and positioned in an output optical fiber block. The array of fibers depicted here includes output fibers 20 and monitor fibers 42. The monitor fibers 42 direct the light beams into the photodetectors 43 of the detector array. These detectors 43 measure the optical power of the light beams in the monitor fibers 42. This optical power information is used by the control circuitry (not shown here) to correct reflector orientation so that optical beams having a desired power are produced. A suitable technique for correcting the reflector orientation using such optical power information is described in detail in the U.S. Patent Application entitled: "Feedback Stabilization of a Loss Optimized Switch", filed on Apr. 30, 2000, Ser. No. 09/548,587, which was previously incorporated by reference.

Figure 7D:
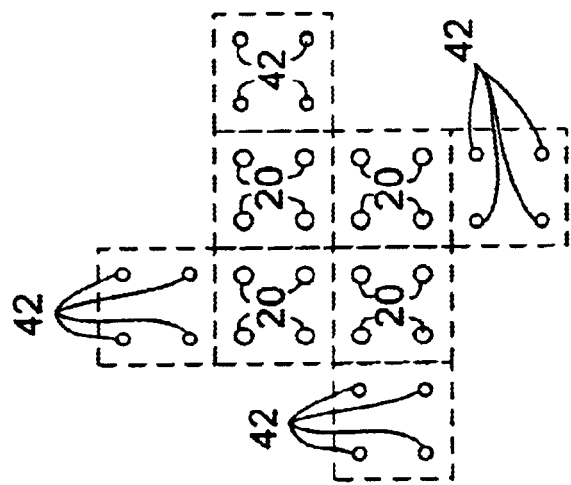
Figure 7C:
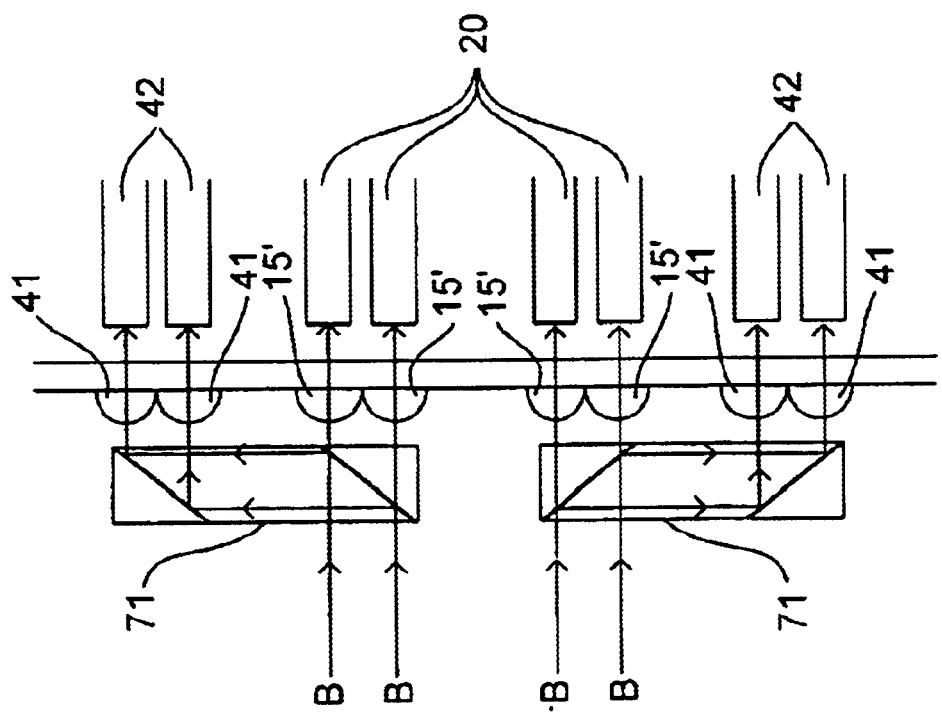

FIG. 7(d) is a plan view depiction of a portion of a switch embodiment showing embodiments of the rhomboid prism assemblies 71 of a rhomboid prism assembly array and the output fiber 20 and monitoring fiber 42 arrays. As can be seen by the illustration of FIG. 7(d), the rhomboid prism assemblies are aligned and positioned above the output fibers 20 and monitoring fibers 42. Other embodiments can include arrays of long, rectangular prism assemblies.

IV. Other Embodiments Use "Two Aperture Detectors" To Measure Monitoring Beam Power And Thereby Determine Working Beam Position And Angle By Using The Measured Monitoring Beam Power.

The principles of the present invention contemplate the use of a number of different detectors to measure monitor beams. One such detector embodiment is a "two-aperture" detector. Such "two-aperture" detector embodiments include a lens and a photodetector. Light blocks having apertures therein are positioned to restrict the light impinging upon the photodetector. By appropriately positioning the apertures with respect to the detector, position and angle information can be obtained from power measurements of impinging monitoring beams. Such embodiments of beam monitoring elements may be incorporated into the optical switch embodiments of the invention.

Figure 8A:
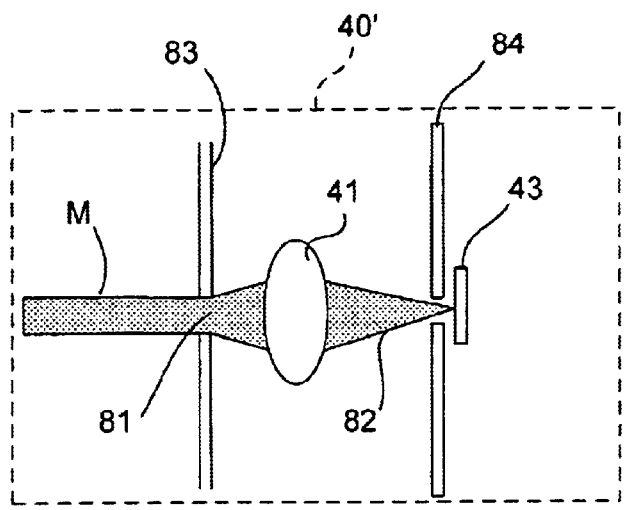
FIGS. 8(a)–8(b) are illustrations of beam monitoring elements used for indirect monitoring of light beams in an optical switch embodiment in accordance with the principles of the present invention.

In FIG. 8(a) a beam monitoring element 40' includes a monitoring lens 41 and a detector element 43. As with the previously discussed elements, the monitor element can be a microlens formed as part of an array of microlenses and the detector element 43 can be a photodetector formed as part of an array of photodetectors. The embodiment of FIG. 8(a) dispenses with the monitoring fiber 42 used in the previously disclosed embodiment. Instead, the depicted embodiment uses light blocks 83, 84 formed of optically non-transmissive materials which block light from the monitoring beams from reaching the detectors 43. Many of the functions of the monitoring fiber are served by apertures 81, 82 formed in the light blocks. The first aperture 81 is formed in the first light block 83 in front of the monitor lens 41 and the second aperture 82 is formed in the second light block 84 in front of the detector 43. In typical embodiments, the first aperture 81 has about the same cross-sectional dimensions as the monitoring beam M. For example, in the case of a circularized beam of 100 micron ($\mu$) in diameter, a circular aperture of about 100 micron ($\mu$) in diameter is preferred. After the monitored beam M passes through the first aperture 81, it passes through a smaller second aperture 82 in a second light block 84. In a typical embodiment, the second aperture 82 is sized on the order of the optical mode of the beam. As used herein, optical mode refers to the optical mode of the optical fibers used in the switching system. For example, in a SMF-28 fiber (such as produced by Corning, Inc. of New York) such optical modes are on the order of about 10$\mu$. Thus, in one such embodiment, a satisfactory second aperture 81 is about 10$\mu$. The detector 43 and the monitoring lens 41 are positioned at a spaced apart distance such that the monitoring beam M is focused on the detector 43. In the depicted embodiment, the apertures 81, 82 are formed in light blocks 83, 84 constructed as components separate from the monitoring lens 41 and the detector 43. However, the embodiments are not limited to such constructions. The light blocks 83, 84 and apertures 81, 82 can be formed directly on the lenses 41 or the sensors 43. Although the exemplary described embodiments are described as having apertures with a circular cross-sections matching the cross-section of their corresponding working beams, it should be appreciated that other cross-sectional dimensions may be used in particular implementations. Indeed, in certain situations, it may be preferable to provide different aperture geometries.

Figure 8B:
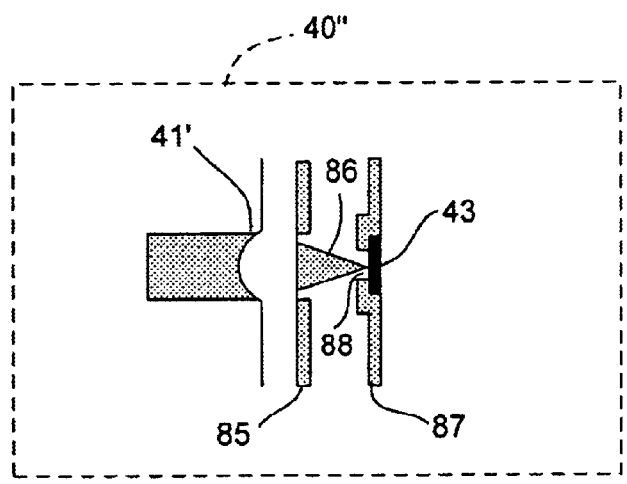

Referring to the embodiment of FIG. 8(b), a beam monitoring element 40'' includes a monitoring lens 41' having a layer of light blocking material 85 formed on a surface of the lens 41'. The purpose of the light block layer 85 is to block the transmission of light. Such light blocking materials are non-transmissive, but can be reflective (such as, gold or aluminum) or absorbent in nature. The layer of light blocking material 85 is positioned to block the monitor beams. Apertures 86 are formed in the layer 85 having much the same dimensions as those apertures discussed with reference to FIG. 8(a). A typical embodiment includes a layer of material 85 coated on either the front or back surface of a lens array having the lens. The first layer 85 can be formed using a light blocking material having light reflecting or light absorbing properties as is known to those having ordinary skill in the art. The apertures 86 are formed in the layer 85 by selective deposition or removal of material. Suitable materials and processes for depositing and removing the layer of material 85 are well known to those having ordinary skill in the art. For example, the layer 85 can be selectively etched to form the first apertures 86. A second layer 87 can also be formed on the photodetector 43. As with the first layer 85, the second layer 87 can be formed using reflective or absorbing light blocking materials known to those having ordinary skill in the art. Typically, the second layer 87 can be formed over an array of photodetectors 43. As with the first layer, portions of the second layer 87 are removed to form second apertures 88. For example, the second layer 87 can be selectively etched to form small second apertures 88 in the second layer 87. The second apertures 88 are constructed such that the underlying photodetectors 43 are revealed. As with the previously discussed embodiments, the second apertures 88 are of a dimension which is on the order of the optical mode of the light beam (e.g., about 10μ). Again, the second layer of material 87 is chosen as a material which does not transmit the light beam. An alternative approach is to fabricate the array of photodetectors such that the photodetectors 43 themselves are constructed having very small sizes on the order of the optical mode of the light beam such that the aperture is formed by the size of the photosensitive area of sensor 43. This can easily be accomplished using ordinary semiconductor fabrication techniques.

Figure 8C:
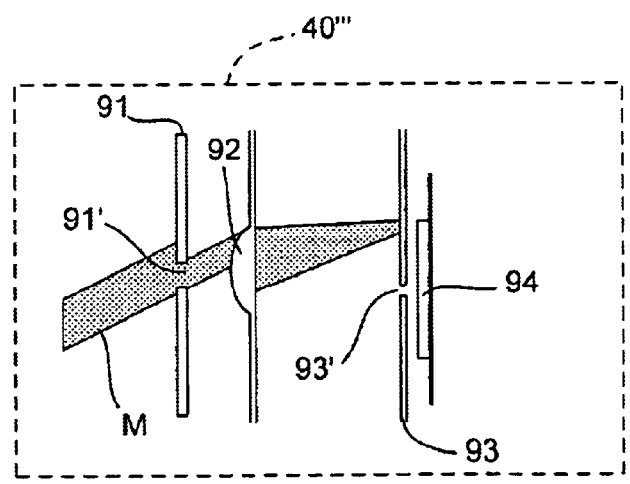
FIGS. 8(c)–8(d) are depictions of beam monitoring elements which illustrate the principles of operation used in certain embodiments of the present invention.

FIG. 8(c) is an illustration of a two-aperture beam monitoring element 40'''. Such elements 40''' work as follows. The size and position of a first aperture 91' (in a first light block 91) allows the detection of variations in light beam position. The size and position of a second aperture 93' (in a second light block 93) allows the detection of variations in light beam entry angle. An optical monitor beam M enters the first aperture 91' where it passes through a lens 92 toward the photodetector 94 and the second aperture 93'. Due to the size of the second aperture 93', little or no light passes through the aperture 93' to impinge upon the photodetector 94. As a result of the reduced power measured by the photodetector 94, it is known that the working beam entry angle is unsatisfactory and adjustments will have to be made in the position of the movable reflectors by the control circuitry, which controls the movable reflectors of the switch. These adjustments will correct the entry angle of the working beams as they enter the output channels (e.g., output fibers).

Figure 8D:
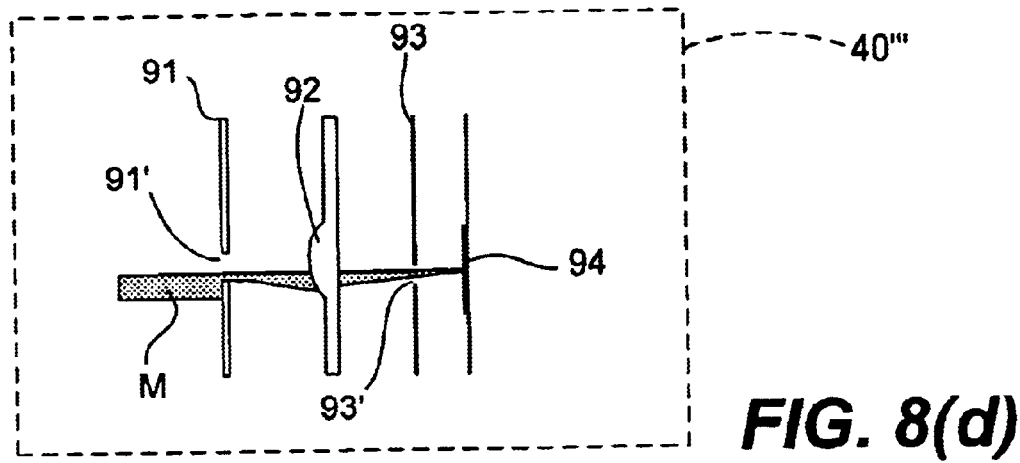

FIG. 8(d) uses the same illustration as in FIG. 8(c) to show how such embodiments 40''' can be used to measure and correct positional misalignment in the monitor beam M (and indirectly the position of the working beam W) by measuring optical power incident on a detector 94. As depicted in the example of FIG. 8(d), if the working beam entering the output channel is positionally misaligned with respect to the output channel the measured optical power of the monitor beam M is reduced. FIG. 8(d) provides an example of this situation. A monitor beam M enters a first aperture 91' where it passes through a lens 92 toward the photodetector 94 and the second first aperture 93'. Where the beam M is positionally misaligned, little or no light passes through the first aperture 91'. Consequently, little or no light passes through the second aperture 93' to impinge upon the photodetector 94. As a result, reduced optical power is measured by the photodetector 94, thereby revealing that beam position is unsatisfactory. Using this optical information and optimization algorithms discussed previously, adjustments are made in the position of the movable reflectors to correct the beam position of the working beams as they enter the output channels (e.g., output fibers).

Figure 8E:
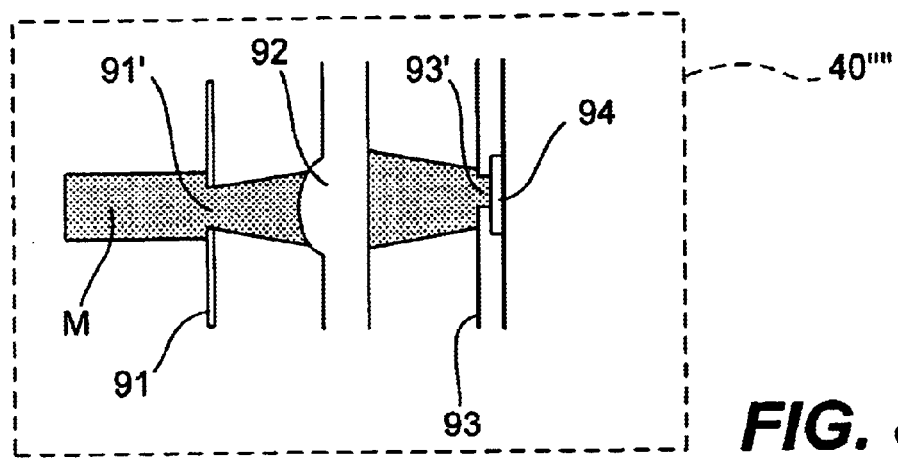
FIG. 8(e) is an illustration of an embodiment of a beam monitoring element used for indirect monitoring of light beams in an optical switch embodiment in accordance with the principles of the present invention.

The forgoing embodiments utilize a monitoring beam that is focused on the detector element 94. Reference to FIG. 8(e) shows still another embodiment of a beam monitoring element 40'''' where such focussing is not necessary. As with other embodiments, the beam monitoring element 40'''' includes a first light block 91, a first aperture 91', a monitoring lens 92, a second light block 93, a second aperture 93', and a photodetector 94. However, in the depicted embodiment the photodetector 94 is positioned with respect to the monitoring lens 92 such that the light beam is not focused on the detector 94. For example, the photodetector 94 can be positioned either in front of (as depicted here) or behind the focal plane of the monitoring lens 92 such that light incident upon the detector is unfocussed.

Two-aperture beam monitoring elements (e.g., those shown in FIGS. 8(a)–8(e)) can be incorporated into various embodiments of the invention. Such a two-aperture beam monitoring element can, for example, be incorporated into the embodiments of FIG. 3 or FIG. 7(a).

V. Two Aperture Detectors Can Be Incorporated With Rhomboid Prisms Into Array Devices For Monitoring And Adjusting Optical Beams.

Figure 9:
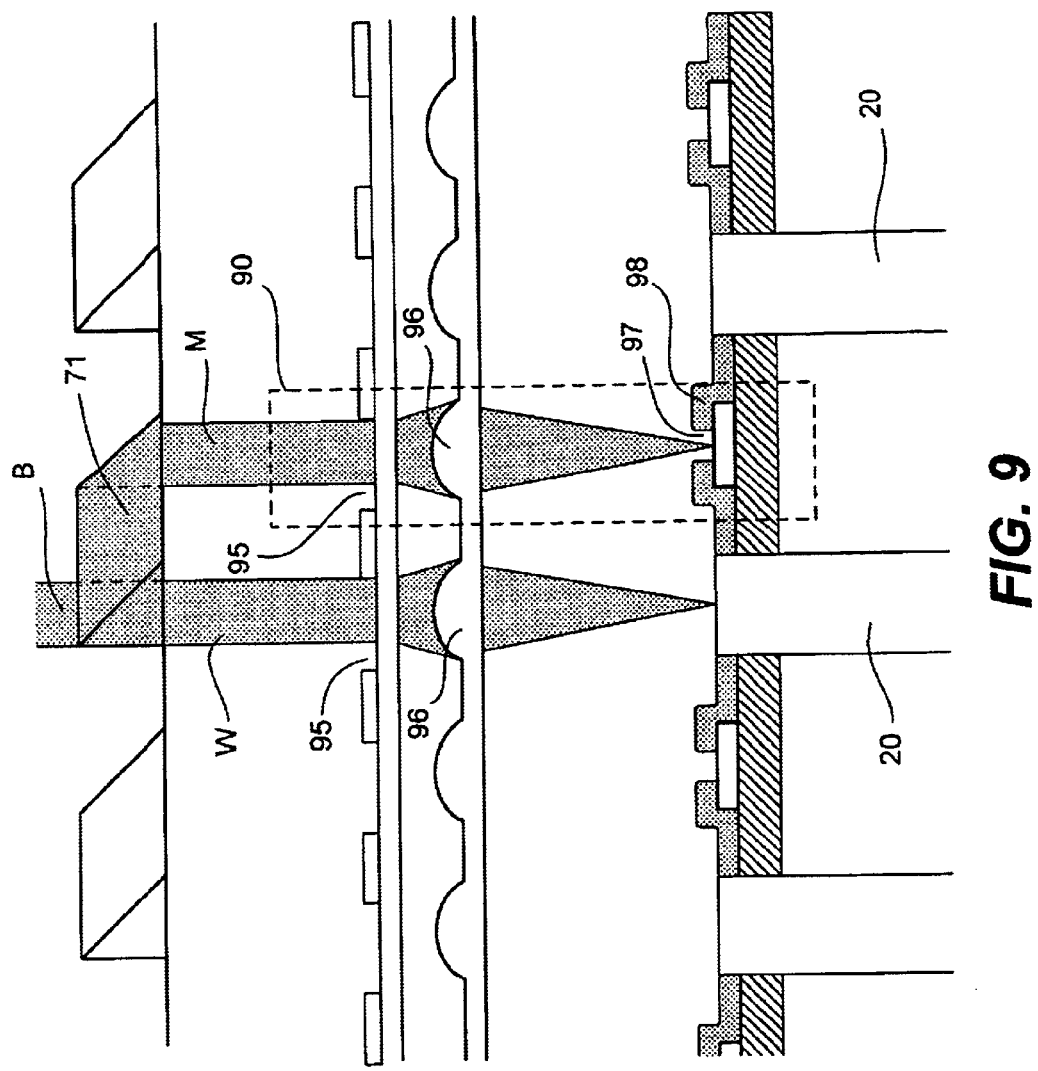
FIG. 9 is an illustration of an array embodiment of beam monitoring elements used for indirect monitoring of light beams in an optical switch embodiment in accordance with the principles of the present invention.

Embodiments of the present invention integrate rhomboid beam splitters with two-aperture detectors. One such embodiment is described with respect to FIG. 9, which shows a two-aperture detector incorporated into an array arrangement. The depicted embodiment incorporates beam monitoring elements 90 having a first aperture 95 and a second aperture 97. In the depicted embodiment, an optical beam B is passed through an optical switch (not shown) into a rhomboid prism assembly 71. As explained previously, the beam is split by the rhomboid prism assembly 71 to create a monitoring beam M and a working beam W. The working beam W passes through a first aperture 95 (in an array of first apertures) and through a microlens 96 (of a microlens array) into an output fiber 20 of a fiber array. A fraction of the light beam has been reflected by the rhomboid prism assembly 71 as a monitor beam M, which is directed through an array of beam monitoring elements. Each beam monitoring element 90 includes a first aperture 95, a microlens 96, a second aperture 97, and a photodetector 98 arranged such that the monitor beam M is directed through the first aperture 95, the microlens 96, the second aperture 97 onto the photodetector 98. It is contemplated by the inventors that other arrangements of the beam monitoring element 90 can be used.

VI. Folded Optical Switch Embodiments Can Be Used To Monitor And Adjust Optical Beams.

Another embodiment uses a folded switch having a single partially reflective surface to create monitoring beams which are remotely monitored. Such remotely monitored monitoring beams are used to adjust and monitor corresponding working beams.

Figure 10:
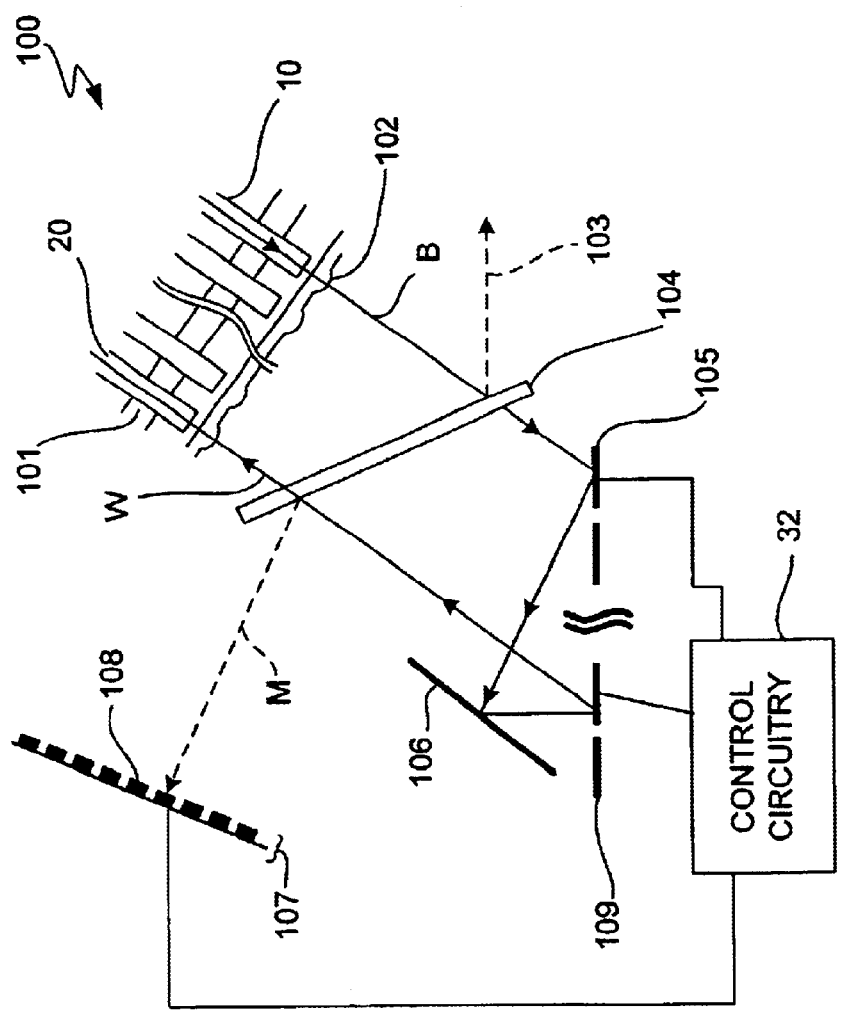
FIG. 10 is an illustration of a "folded" optical switch embodiment using indirect monitoring of light beams in accordance with the principles of the present invention.

FIG. 10 shows a folded optical switch embodiment 100 in accordance with the principles of the present invention. The embodiment 100 includes an array 107 of beam monitoring structures 108. Some of the advantages of this embodiment are that a single fiber block 101 can be used to secure and align all the fibers entering the switch 100. This includes input fibers 10 as well as output fibers 20. Also, such an embodiment does not require the use of a monitor fiber. As a result, such an embodiment drastically simplifies the fiber alignment process. Aspects of the invention are illustrated with respect to a single optical beam B, which enters the switch through the input fiber 10, passes through a lens 102 (which is part of a lens array) onto partially reflective surface 104. The single partially reflective surface 104 has a constant alignment and all optical beams in the system can be passed through it. A fraction of the light from the optical beam B is reflected by the partially reflective surface 104. In preferred embodiment, this fractional reflective light is reflected as fractional reflective beams such that its light will not be reflected back into the optical fibers 10, 20, or onto the detector array 107 (such reflected light can result in noise in the signal). One such fractional reflective beam is depicted by the dotted line 103. The remaining light from the optical beam passes through the partially reflective surface 104 onto a first movable reflector 105, which comprises part of a reflector array. As with the previous embodiments, the most advantageous implementation of the movable reflectors is a micro-electro-mechanical machined system (MEMS) of reflectors. The optical beam is reflected from the first movable reflector 105 onto a fixed reflective surface 106. The fixed reflective surface 106 typically comprises a single reflective surface, which also like partially reflective surface 104 does not contain any moving parts and requires only a single alignment. The optical beam is reflected from the single reflective surface 106 onto a second movable reflector 109. Second movable reflector 109 can be part of the same reflector array as first movable reflector 105 or can be part of a second array of movable reflectors (as shown in the depicted embodiment). The beam is reflected from second movable reflector 109 such that it is aimed at the desired output fiber 20. A fraction of the beam is reflected by (and another fraction of the beam passes through) the partially reflective surface 104. This fractionally reflected light comprises a monitor beam M and the other fraction of the beam passing through the partially reflective surface 104 is referred to as a working beam W. The monitor beam M is directed towards a detector array 107 of beam monitoring elements 108, where the optical power of the monitor beam M is measured by one of the beam monitoring elements 108 of the detector array 107. The beam monitoring elements, like that shown in FIG. 3 or FIGS. 8(*a*)–8(*e*), are suitable for this implementation. Returning to the optical beam B, when properly aligned the bulk of the optical energy from the beam B passes through the partially reflective surface 104 (as working beam W), through the lens 102 of the lens array, and into an output fiber 20. As with the foregoing embodiments, the optical power of the monitored beam M bears a relationship to the optical power in the working beam W introduced into the output fiber 20. As with the foregoing embodiments, this relationship between working beam W and monitored beam M is calibrated (as discussed hereinbelow) and used in cooperation with the switch control circuitry 32 to move the reflectors 13, 14 such that the working beam W is introduced into the output fiber 20 having the desired optical characteristics (e.g., proper angle, proper position, desired power level).

VII. Methods of Implementing Indirect Beam Monitoring to Adjust and Monitor a Working Beam.

The principles of the present invention further include methods for indirectly measuring optical power in a switch and using these indirect measurements to adjust the working beams such that they exit the switch having the desired optical properties, including but not limited to, minimum loss of working beam power. Such methods can be practiced using the forgoing embodiments as well as other switch embodiments.

In a switch embodiment including two reflectors for each optical beam path (e.g., FIG. 3), the power of the working beam coupled into the output fiber and the power detected in the beam monitoring element are each functions of the same four variables, which are the two reflector angles of the input reflector and two reflector angles of the output reflector. If the optical powers of the working beam and monitor beam are optimized for the same values of the four reflector angles, optimization of the working beam can be achieved by optimizing the monitor beam. Techniques for this form of four-variable optimization are well known to those skilled in the art, for example, gradient search and random search techniques (See, E. Kreyszig, "Advanced Engineering Mathematics", John Wiley & Sons 1993, which is hereby incorporated by reference).

Figure 11B:
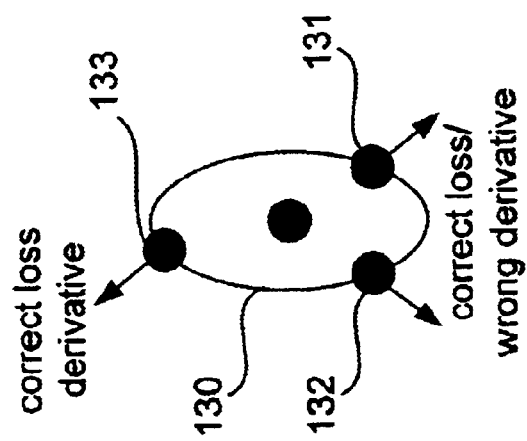
FIGS. 11(a) and 11(b) are optical power contour diagrams in accordance with the principles of the present invention.
Figure 11A:
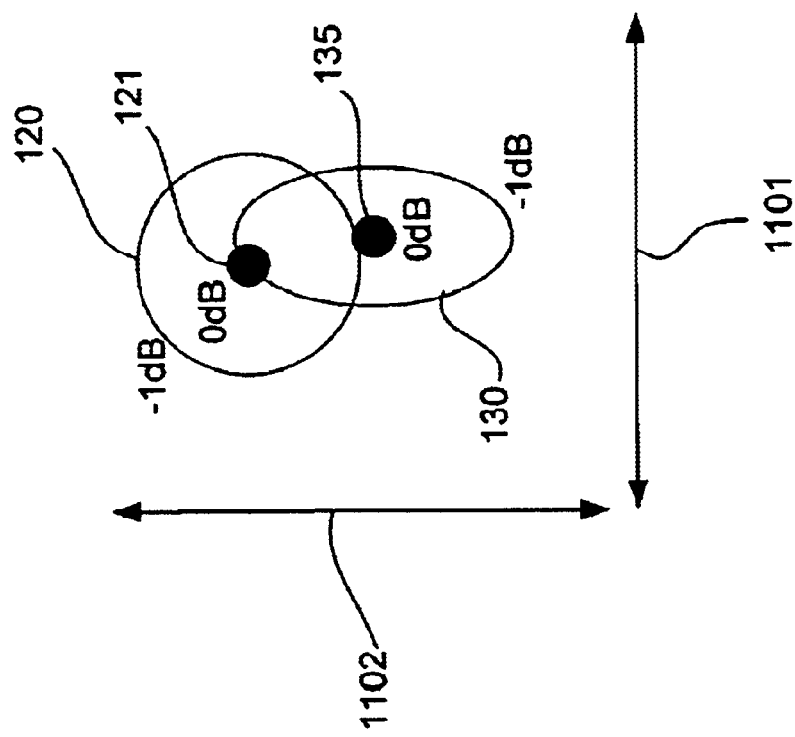

In general, the optical path for the monitor beam will not be an exact replica of the working beam, and so a feedback method is needed which allows the monitor beam to be stabilized away from its optimum position. This principle is illustrated in FIG. 11(*a*), where contours of constant working beam power and monitor beam power are plotted in two of the four possible dimensions (one dimension for each variable), similar to a topographical contour map. Although the stabilization problem is more difficult to visualize with all four variables, these contour diagrams illustrate the same mathematical principles. Any two of the four variables could be plotted for this illustration, here one axis 1101 defines an input mirror angle (such as the angle of reflector 13' of FIG. 3) and another axis 1102 defines output mirror angle (such as the angle of reflector 14' of FIG. 3) are shown. Other reflector parameters, besides reflector angle, can be defined by the axes. Examples of such reflector parameters include, but are not limited to, voltage supplied to the reflectors, distance the reflectors are deflected, twisting force applied to the reflectors, different combinations of reflectors, as well as other variable related to reflector orientation.

As stated previously, FIG. 11(*a*) shows contour diagram where reflector angles are used to optimize reflector coupling. Working beam contour point 121 defines a region of reflector deflection angles wherein the power loss is at or near 0 dB (i.e., a very nearly optimized beam). As the reflectors are tilted from these angles the power loss increases. For example, working beam contour line 120 defines a set of reflector angles where the output power is 1 dB lower (i.e., −1 dB) than for optimal coupling, where the other two reflector angles (that are not illustrated) are maintained at their optimum values.

Similarly, the monitor beam also has contour lines related to the same combinations of reflector angles. If the working beam and the monitor beam were in perfect agreement then the two contour diagrams would be identical and overlapping and there would be no need for calibrating the monitor beam to the working beam. However, this is not normally the case. Typically, the two contour diagrams are different. However, some similarities remain, the monitor beam also has a region of maximum power coupling, shown here as monitor beam contour point 135. Likewise, the monitor beam also has a region of reduced power, such as the contour line 130 defining the angles for which the monitor beam is 1 dB lower than for monitor beam contour point 135. In this illustration, when the working beam exhibits optimum fiber coupling (at working beam contour point 121) the monitor beam power is reduced by 1 dB from its optimum value. Optimization of the working beam using the monitor beam is complicated by the fact that many combinations of mirror angles make up the −1 dB monitor contour 130, but only one point that coincides with maximum working beam power 121. Therefore, a simple feedback method that holds the monitor beam power at a value of −1 dB from its peak value will not properly stabilize the mirror angles at their correct location to minimize switch loss.

However, by measuring the derivative function of a monitor beam power function with respect to each reflector angle, optimum reflector alignment for each working beam may be determined. These derivatives are found from the change in monitor beam power as each reflector angle is varied away from its nominal position. For example, in a system where each optical beam is reflected by two reflectors, optical beams are adjusted by tilting each reflector about two axes. In order to generate appropriate derivatives an initial power measurement is made, then each reflector is tilted about an angle in each axis and the power is measured. Thus the reflectors angles can be described by five power readings. These five power readings are used to compute four derivatives. For example, an initial power measurement is made. Then a first reflector is moved in one axis from its nominal position and the monitor beam power is measured. The reflector is returned to its nominal position and the first reflector is moved from its nominal position in a second axis and monitor beam optical power is measured. The procedure is repeated two more times for the second reflector in the beam's optical path. Thus, measurements of optical power are conducted for each of the two reflectors in two axes (for a total of four derivative measurements plus the initial power measurement).

The effect of variations in input optical power can be removed by dividing each derivative by the optical power to produce four independent derivative values that depend only on mirror angle, and not on the input optical power. Only the low-loss solution has the correct value of all derivatives, as illustrated in FIG. 11(b), where the function derivatives are illustrated by arrows that point in the direction from higher to lower monitor beam power. Only the minimum loss point 133 has the correct derivatives, meaning that the monitor power loss changes the same amount when the mirrors are changed slightly as it did when the optimum working loss point was established. Mirror angles corresponding to points 131 and 132 demonstrate the correct degree of power loss, but have the wrong derivatives. This relationship is illustrated in a two-dimensional plot with two variables, but the same principle for mirror optimization holds for the four-mirror variable optical switch.

The procedure for minimizing loss of the working beam consists of splitting the working beam to produce a working beam and monitor beam, measuring the four derivatives of the monitor beam at the point of minimum loss of the working beam as part of a calibration process, then controlling the four mirror angles of the two mirrors in a switch path to set the four monitor beam derivatives to the same value found in the calibration process. This procedure reduces to a well-known mathematical procedure of optimizing the values of four independent variables (the mirror angles or voltages) to produce four desired dependent variables (the monitor beam derivatives). Techniques for this multivariable optimization are well known to those skilled in the art of control systems; however, the process will be described in more detail here. This problem can be solved more simply than many arbitrary functions solved in control systems as here the shape of the four derivative functions can be determined in advance. The only unknowns are small offsets in mirror voltages resulting from mirror drift.

Figure 12:
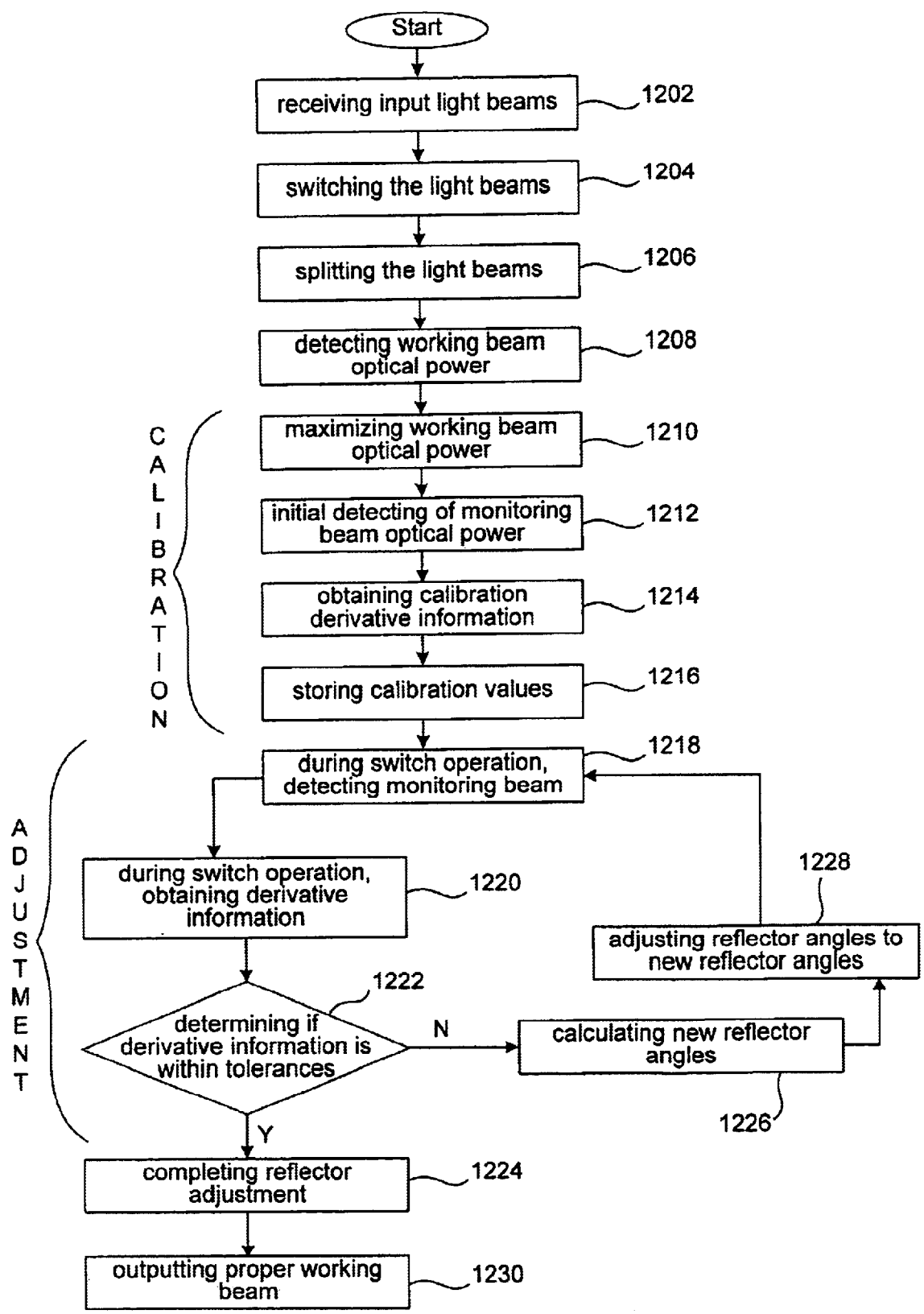
FIG. 12 is a flowchart diagram of a method embodiment in accordance with the present invention.

FIG. 12 is a flow diagram depicting one embodiment of an optimization method in accordance with the principles of the present invention. The input light beams are introduced into and received by an optical switch (Step 1202). The input light beams are switched by the reflectors of the optical switch (Step 1204). After exiting the reflectors, the light beams are split into monitor beams and working beams (Step 1206). The working beam is coupled into the output fiber, but the optical loss may be high because the reflector angles may not be precisely adjusted. The optical power of the monitor beam is detected (Step 1208).

The loss of the switch is minimized by maximizing the power in the working beam (Step 1210). The working power maximum is detected by external calibration power measurement equipment used only during this calibration phase (Step 1212). During this step, the switch loss is minimized using conventional maximization techniques previously discussed (e.g., in "Advanced Engineering Mathematics", E. Kreyzig). The values of the derivatives of the monitor beam are obtained for this optimum loss condition (Step 1214) and stored for future use (for example, using a lookup table) without external power measurement equipment (Step 1216). This calibration may be obtained at more than one temperature to account for temperature dependent variations between the working beam and monitor beam.

During operation of the embodiment, after calibration, the operating (operative) optical power of the monitor beam is detected (Step 1218) and operative derivative information is obtained (Step 1220). The value of the operative monitor beam derivatives are compared to the values found in calibration corresponding to the mirror alignment for lowest working beam loss (Step 1222). If the operative derivatives are within a predetermined error tolerance corresponding to the loss tolerance allowed for mirror position error, the reflector adjustment is complete (Step 1224) and a proper working beam can be output (Step 1230). The operative derivative information is periodically checked throughout the operation of the switch to make sure that the mirror alignment has not drifted (Step 1218).

If the monitor beam operative derivatives are not within the predetermined error tolerance (for example, within 1% of the desired value), then the mirror alignment is modified using a reflector position optimization technique (Step 1226). Two common methods for this optimization are random walk and gradient search.

In a random walk optimization embodiment, one mirror is moved slightly (Step 1228) and the monitor path derivatives are recomputed (Steps 1218, 1220, 1226, and 1228). If the new set of mirror positions produces monitor beam derivatives closer to the calibration derivative values, this becomes the new baseline position for that mirror and the next random walk position will start from these mirror positions (Step 1222). Otherwise the previous set of mirror positions remains the baseline, and a random walk is tried in another direction or with a new change on the other mirror axis or other mirror (Step 1226).

In addition to random walk and gradient optimization, a model can be used to more quickly find the optimum mirror angles. For example, in a specific case where the gradients can be modeled as a function of mirror angle error in each axis, a simple model can be employed. One suitable model for the loss of optical power in a switch defines such loss such that power loss is quadratic in each axis. Therefore, the total loss is proportional to the sum in dB of the mirror error squared for each axis. Each mirror is moved slightly (Step 1228), and the beam derivatives are measured (Step 1220). These measurements are compared to the model to predict how much each mirror should be rotated to minimize optical loss.

Although the foregoing embodiment is disclosed with regard to a two-reflector switching array, the inventors contemplate its use with a single reflector for each light beam. In such a case, obtaining derivative information (Step 1207) and calculating derivatives (Step 1209) are much simplified. Also, the inventors contemplate the use of this invention with switching embodiments having three or more reflectors.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. In particular, it is contemplated by the inventors that the principles of the present invention can be practiced with optical switch embodiments having one, two, three, and more movable mirror planes. Also, it is contemplated that the embodiments of the invention can be practiced with a wide range of other types of beam monitoring elements. Also, the principles of the present invention may be practiced with switches having other structures and reflector geometries. For example, although the invention is illustrated using MEMS reflectors, other reflectors or optical beam steering mechanisms (such as lens or fiber displacement) can be used. Furthermore, the examples provided herein are intended to illustrative rather than limiting. The inventions illustratively disclosed herein can be practiced without any element which is not specifically disclosed herein.

We claim:

1. An optical switch comprising:
    an array of optical input channels each capable of carrying an associated input light beam;
    an array of output channels;
    a switching array for coupling selected input channels to selected output channels enabling the switching of each input light beam to one of a plurality of output channels;
    a first beam splitter optically interposed between the switching array and the array of output channels to split input light beams into a monitor beam and a working beam; and
    an array of beam monitoring elements wherein each beam monitoring element is arrange to receive a monitor beam and wherein each beam monitoring element comprises:
    a first detector element;
    a second detector element; and
    a second beam splitter arranged to receive the monitor beam and reflect a portion of the monitor beam into the second detector element while directing another portion of the monitor beam onto the first detector element;
    wherein the first and second detectors of each beam monitoring element measure optical power of the respective portions of a monitor beam such that both the angular misalignment and the positional misalignment of a working beam can be detected and adjusted such that the working beams enter the output channels having desired optical characteristics.

2. An optical switch as in claim 1 wherein the beam splitter comprises a partially reflective surface optically positioned such that the monitor beam is reflected by the partially reflective surface onto the array of beam monitoring elements, and such that the working beam passes through the partially reflective surface onto the array of output channels.

3. An optical switch as in claim 1 wherein the optical information provided by the bean monitoring element enables the adjustment of the working beam to adjust for positional misalignment errors and angular misalignment errors so that the working beams enter the output channels having desired optical characteristics.

4. An optical switch as in claim 3 wherein a single beam monitoring element measures optical power in a monitor beam such that both the angular misalignment and the positional misalignment of a working beam can be detected and adjusted.

5. An optical switch as in claim 1 wherein the first and second detector elements of each beam monitoring element comprise a position sensitive detector.

6. An optical switch as in claim 1 wherein the bear monitoring elements provide optical information used to adjust the working beams such that the beams enter the output channels having a desired optical power.

7. An optical switch as in claim 6 wherein the desired optical power is an optimal amount of optical power.

8. An optical switch as in claim 1, wherein the first beam splitter is included as part of a rhomboid prism assembly which is positioned such that the monitor beams and the working beams exit the rhomboid prism assembly substantially parallel to each other.

9. An optical switch as in claim 1, wherein the switching array comprises, in combination, control circuitry, a first movable reflector array, and a second movable reflector array, each array including a plurality of movable reflectors, the position of which is controlled by control circuitry, wherein the reflectors are positioned such that the input light beams pass onto the first movable reflector array, and such that the plurality of input light beams are reflected from the movable reflectors of the first reflector array onto the reflectors of the second reflector array enabling the switching of the input light beams to selected output channels.

10. An optical switch as in claim 9 further including:
    a first lens array including a plurality of first lenses, positioned such that the plurality of input light beams pass through the plurality of first lenses onto the switching array; and
    a second lens array including a plurality of second lenses, positioned such that the working beams pass through the plurality of second lenses into the output channels.

11. An optical switch as in claim 10 wherein the working beams enter the output channels having optimized beam power.

12. An optical switch as in claim 11 wherein the control circuitry, using information provided by the beam monitoring elements, adjusts the angular misalignment and the positional misalignment of the working beams.

13. An optical switch as in claim 10 wherein the monitor lenses of the beam monitoring elements are included as part of the second lens array.

14. An optical switch as in claim 9 wherein the plurality of output channels comprise a plurality of output fibers.

15. An optical switch as in claim 1 wherein each beam monitoring element includes:
    the first detector element comprising first quadrature detector element; and
    the second detector element comprising a second quadrature detector element.

16. An optical switch as in claim 1 wherein the portion of the light measured by the first detector element provides information used to determine and adjust the position of the working beam; and
    wherein the another portion of the light measured by the second detector element is used, in conjunction with the portion of the light measured by the first detector element, to provide information used to determine and adjust the angle at which the working beam enters the output channels.

17. An optical switch comprising:
    an array of optical input channels each capable of carrying an associated input light beam;
    an array of output channels;
    an array of beam monitoring elements;
    a switching array for coupling selected input channels to selected output channels enabling the switching of each input light beam to one of a plurality of output channels;
    a beam splitter optically interposed between the switching array and the array of output channels to split input light beams into a monitor beam and a working beam; and wherein each beam monitoring element measures one of the monitor beams to provide optical information used for adjusting the switching array such that the working beams enter the output channels having desired optical characteristics;

a first light block having formed therein, a first aperture;

a monitor lens; and a detector element for detecting a monitor beam after it pass through the first aperture and passes through the monitor lens wherein the monitor beam provides positional misalignment information concerning a working beam associated with the monitor beam.

18. An optical switch as in claim 17 wherein the detector element includes a small surface area sized such that the monitor beam passing through the first aperture and passing through the monitor lens and impinging on the small detector element provides information regarding the angular misalignment of the working beam.

19. An optical switch as in claim 17 the detector element comprises:

a second light block positioned to block a monitor beam from impinging on the detector element;

a second aperture formed in the second light block to reveal a surface area of the detector element, enabling the monitor beam reach the detector element;

wherein the second aperture is sized to reveal a surface area on the detector element such that the monitor beam passing through the first aperture and passing through the monitor lens and impinging on the small detector element provides information regarding the angular misalignment of the working beam.

20. An optical switch us in claim 19 wherein the first aperture has approximately the same cross-sectional dimensions as the monitor beam; and wherein the second aperture has approximately the same cross-sectional dimensions as we optical mode of the monitor beam.

21. An optical switch as in claim 19 wherein the first aperture has approximately the same cross-sectional dimensions as the monitor beam.

22. An optical switch as in claim 19 wherein the second aperture has approximately the same cross-sectional dimensions as the optical mode of the monitor beam.

23. An optical switch as in claim 17 wherein the monitor lens is positioned with respect to the detector element such that a monitor beam passing through the monitor lens is focused on the surface of the detector element.

24. An optical switch as in claim 17 wherein the monitor lens is positioned with respect to the detector element such that a monitor beam passing through the monitor lens is not focused on the surface of the detector element.

* * * * *

UNITED STATES PATENT AND TRADEMARK OFFICE
CERTIFICATE OF CORRECTION

PATENT NO. : 6,819,815 B1
DATED : November 16, 2004
INVENTOR(S) : Corbalis et al.

It is certified that error appears in the above-identified patent and that said Letters Patent is hereby corrected as shown below:

Column 21,
Line 8, change "to illustrative" to -- to be illustrative --.
Line 51, change "bean monitoring" to -- beam monitoring --.
Line 64, change "the bear" to -- the beam --.

Column 23,
Line 9, change "pass through" to -- passes through --.

Column 24,
Line 7, change "us in claim" to -- as in claim --.
Line 11, change "we optical" to -- the optical --.

Signed and Sealed this

Twenty-sixth Day of April, 2005

JON W. DUDAS
*Director of the United States Patent and Trademark Office*